(12) United States Patent
Ozaki et al.

(10) Patent No.: US 8,489,845 B2
(45) Date of Patent: Jul. 16, 2013

(54) STORAGE SYSTEM COMPRISING MULTIPLE STORAGE CONTROL APPARATUS

(75) Inventors: Satoru Ozaki, Odawara (JP); Yuko Matsui, Odawara (JP); Masayuki Yamamoto, Sagamihara (JP); Shigeo Homma, Odawara (JP); Hiroshi Kawano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 13/203,764

(22) PCT Filed: Jun. 14, 2011

(86) PCT No.: PCT/JP2011/003391
§ 371 (c)(1),
(2), (4) Date: Aug. 29, 2011

(87) PCT Pub. No.: WO2012/172601
PCT Pub. Date: Dec. 20, 2012

(65) Prior Publication Data
US 2012/0324202 A1 Dec. 20, 2012

(51) Int. Cl.
*G06F 12/02* (2006.01)
(52) U.S. Cl.
USPC ..... 711/172; 711/154; 711/173; 711/E12.002
(58) Field of Classification Search
USPC ............................ 711/172, 154, 173, E12.002
See application file for complete search history.

(56) References Cited

U.S. PATENT DOCUMENTS

| | | |
|---|---|---|
| 6,658,478 B1 | 12/2003 | Singhal et al. |
| 6,684,209 B1 | 1/2004 | Ito et al. |
| 7,337,350 B2 | 2/2008 | Mimatsu et al. |
| 7,441,095 B2 | 10/2008 | Tamura et al. |
| 7,555,601 B2 | 6/2009 | Yamagami |
| 7,587,551 B2 | 9/2009 | Fujibayashi et al. |
| 2006/0271758 A1 | 11/2006 | Innan et al. |
| 2008/0091748 A1 | 4/2008 | Beniyama et al. |
| 2008/0184000 A1 | 7/2008 | Kawaguchi |
| 2008/0263190 A1 | 10/2008 | Serizawa et al. |
| 2011/0060885 A1 | 3/2011 | Satoyama et al. |

OTHER PUBLICATIONS

U.S. Appl. No. 12/918,608, filed Jul. 16, 2010.
U.S. Appl. No. 13/061,291, filed Jan. 5, 2011.

*Primary Examiner* — Yong Choe
(74) *Attorney, Agent, or Firm* — Mattingly & Malur, PC

(57) ABSTRACT

A pool, which is configured by multiple actual areas, is formed on the basis of two or more storage devices. A second storage control apparatus (DKC) determines, for each storage device, an unused capacity to be given to a first DKC with respect to each first DKC based on an unused capacity of each storage device and a request value of each storage device for each first DKC, and gives, for each first DKC, the unused capacity for each storage device determined with respect to the first DKC, to this first DKC. The request value of the storage device is based on a performance value, which is a value related to the performance of this storage device. The total capacity of multiple actual areas allocated to the virtual volumes by the first DKC is equal to or less than the unused capacity given with respect to each storage device.

15 Claims, 24 Drawing Sheets

FIG. 2
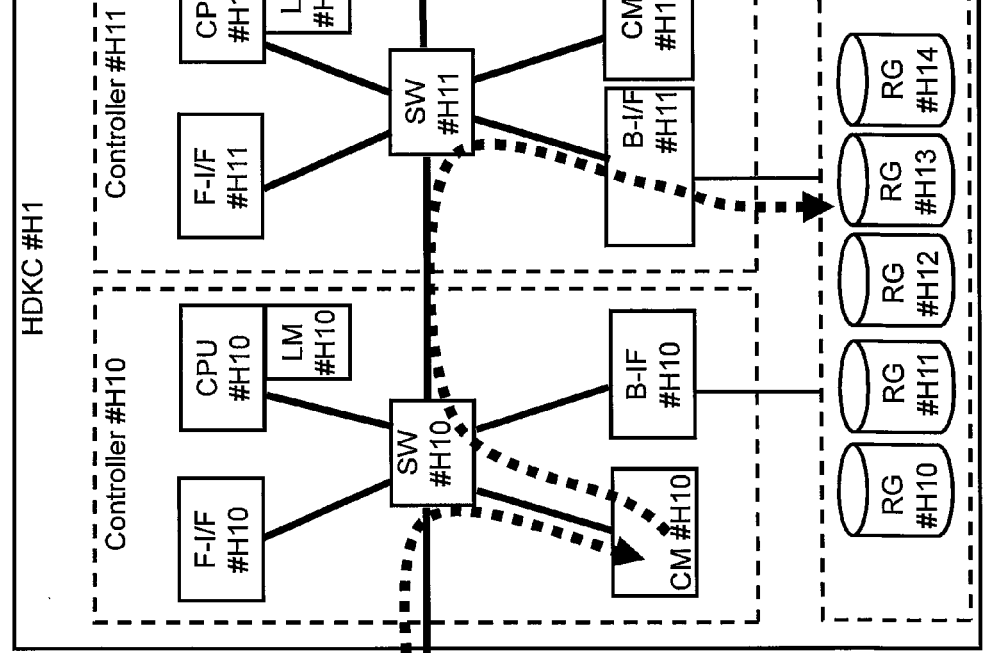
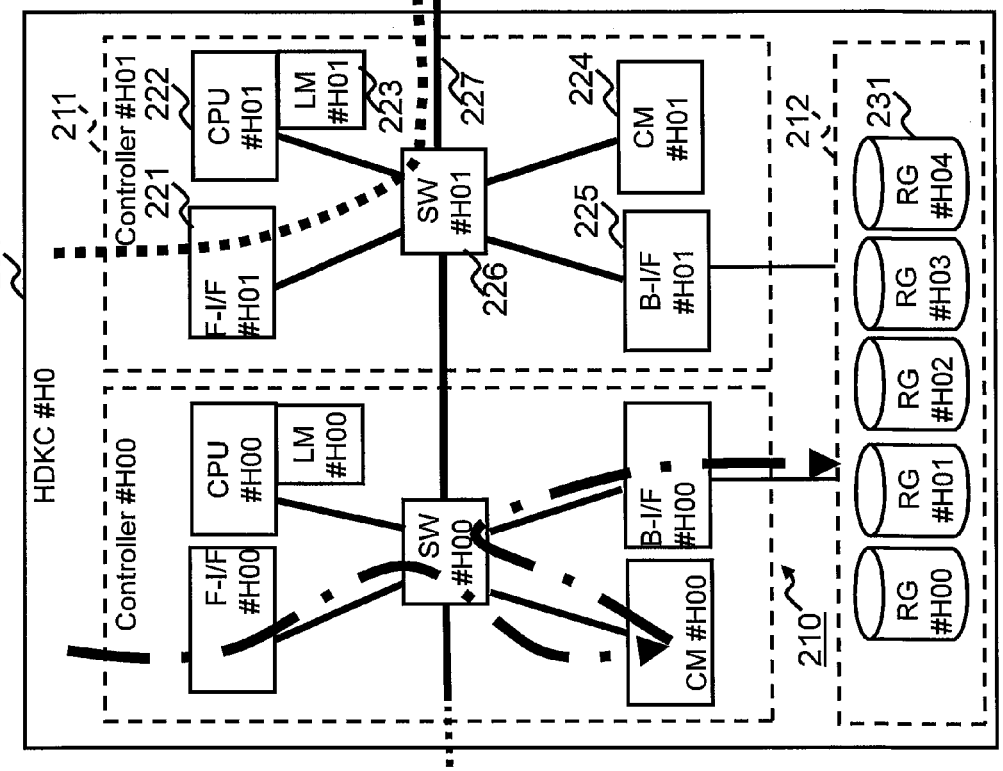

FIG. 9

Virtual page management table (#H0) _325_

| DP-LU ID 1301 | Virtual page address 1302 | Allocation status 1303 | Pool LU ID 1304 | Actual page address 1305 |
|---|---|---|---|---|
| 7 | 0x00 | Unallocated | — | — |
| | 0x01 | Allocated | 0 | 0x00 |
| | 0x02 | Unallocated | — | — |
| | 0x03 | Allocated | 1 | 0x01 |
| | 0x04 | Unallocated | — | — |
| | 0x05 | Allocated | 2 | 0x02 |
| | 0x06 | Unallocated | — | — |
| ... | ... | ... | ... | ... |

FIG. 10A

Tier management table (#H0) 321

| RG ID 901 | LU ID 902 | Coupling mode 903 | PDEV type 904 | Total (Tier level) 905 |
|---|---|---|---|---|
| H00 | 0 | 0 | 1 | 1 |
| H00 | 1 | 0 | 1 | 1 |
| H01 | A | 1 | 1 | 2 |
| H02 | B | 5 | 1 | 6 |
| H04 | C | 0 | 3 | 3 |
| ... | ... | ... | ... | ... |

FIG. 10B

| Coupling mode | PDEV type |
|---|---|
| Own DKC or first coupling | SSD |
| 0 | 1 |
| Third coupling | SAS |
| 1 | 3 |
| Second coupling | SATA |
| 5 | 10 |

FIG. 11

LU mapping table (#H0)    322

| LU ID | DKC ID | External LU ID | LU type |
|---|---|---|---|
|  | 1502 | 1503 (Third coupling mode) | 1504 |
| A | H0 | Y | Non-DP-LU |
| B | H2 | X | DP-LU |

FIG. 12A

Actual page management table (#H0) 326

| Table pointer 2001 | Pool LU ID 2002 | Actual page address 2003 | Allocation status 2004 | DP-LU ID 2005 | Unallocated queue pointer 2006 |
|---|---|---|---|---|---|
| 0x0000 | 0 | 0x00 | Allocated | 1 | — |
| 0x0001 | | 0x01 | Unallocated | — | 0x1000 |
| 0x0002 | | 0x02 | Unallocated | — | 0x1002 |
| .. | | .. | .. | .. | .. |
| 0x1000 | 1 | 0x00 | Unallocated | — | 0x2000 |
| 0x1001 | | 0x01 | Allocated | 1 | — |
| 0x1002 | | 0x02 | Unallocated | — | 0x2001 |
| .. | | .. | .. | .. | .. |
| 0x2000 | 2 | 0x00 | Unallocated | — | 0x0002 |
| 0x2001 | | 0x01 | Unallocated | — | 0x3000 |
| 0x2002 | | 0x02 | Allocated | 1 | — |
| .. | | .. | .. | .. | .. |
| 0x20FF | | 0xFF | Unallocated | — | — |

FIG. 12B

Queue management table (#H0) 327

| First-page pointer | Last-page pointer |
|---|---|
| 0x0001 | 0x20FF |

FIG. 13A

Request ratio table #H0

| LU-ID ($q=$) | Tier level ($T_{q0}$) | Performance value ($P_{q0}$) | Original request ratio ($r_{q0}$) |
|---|---|---|---|
| 0 | $T_{00}$ | $P_{00}(=1/T_{00})$ | $r_{00}(=P_{00}/\Sigma P_0)$ |
| 1 | $T_{10}$ | $P_{10}(=1/T_{10})$ | $r_{10}(=P_{10}/\Sigma P_0)$ |
| 2 | $T_{20}$ | $P_{20}(=1/T_{20})$ | $r_{20}(=P_{20}/\Sigma P_0)$ |
| 3 | $T_{30}$ | $P_{30}(=1/T_{30})$ | $r_{30}(=P_{30}/\Sigma P_0)$ |
| 4 | $T_{40}$ | $P_{40}(=1/T_{40})$ | $r_{40}(=P_{40}/\Sigma P_0)$ |

Request ratio table #H5

| LU-ID ($q=$) | Tier level ($T_{q5}$) | Performance value ($P_{q5}$) | Original request ratio ($r_{q5}$) |
|---|---|---|---|
| 0 | $T_{05}$ | $P_{10}(=1/T_{05})$ | $r_{05}(=P_{05}/\Sigma P_5)$ |
| 1 | $T_{15}$ | $P_{11}(=1/T_{15})$ | $r_{15}(=P_{15}/\Sigma P_5)$ |
| 2 | $T_{25}$ | $P_{12}(=1/T_{25})$ | $r_{25}(=P_{25}/\Sigma P_5)$ |
| 3 | $T_{35}$ | $P_{13}(=1/T_{35})$ | $r_{35}(=P_{35}/\Sigma P_5)$ |
| 4 | $T_{45}$ | $P_{14}(=1/T_{45})$ | $r_{45}(=P_{45}/\Sigma P_5)$ |

FIG. 13C

Request ratio table #H9

| LU-ID ($q=$) | Tier level ($T_{q9}$) | Performance value ($P_{q9}$) | Original request ratio ($r_{q9}$) |
|---|---|---|---|
| 0 | $T_{09}$ | $P_{09}(=1/T_{09})$ | $r_{09}(=P_{09}/\Sigma P_9)$ |
| 1 | $T_{19}$ | $P_{19}(=1/T_{19})$ | $r_{19}(=P_{19}/\Sigma P_9)$ |
| 2 | $T_{29}$ | $P_{29}(=1/T_{29})$ | $r_{29}(=P_{29}/\Sigma P_9)$ |
| 3 | $T_{39}$ | $P_{39}(=1/T_{39})$ | $r_{39}(=P_{39}/\Sigma P_9)$ |
| 4 | $T_{49}$ | $P_{49}(=1/T_{49})$ | $r_{49}(=P_{49}/\Sigma P_9)$ |

FIG. 14A

Unused capacity management table (#H0) _329_

| Number of unallocated pages _1401_ | Previous number of unallocated pages _1402_ | Page usage _1403_ |
|---|---|---|
| 430 | 1290 | 660 |

FIG. 14B

Detailed unused capacity management table (#H0) _330_

| LU ID _1411_ | Pool reserved capacity _1412_ | Unallocated page capacity _1413_ | Previous unallocated page capacity _1414_ | Page usage _1415_ | Percentage of LU in use _1416_ |
|---|---|---|---|---|---|
| 0 | 1000 | 300 | 900 | 600 | 60% |
| 1 | 300 | 100 | 300 | 200 | 66% |
| 2 | 100 | 30 | 90 | 60 | 60% |

FIG. 15A

| Utilization ratio | H0 | H5 | H9 |
|---|---|---|---|
| | 0.60 | 0.40 | 0.20 |

FIG. 15B

| LU ID ($q=$) | Unused capacity ($V_q =$) |
|---|---|
| 0 | $V_0 = 200.00$ |
| 1 | $V_1 = 300.00$ |
| 2 | $V_2 = 150.00$ |
| 3 | $V_3 = 100.00$ |
| 4 | $V_4 = 250.00$ |

FIG. 16A

| LU ID ($q=$) | Unused capacity ($V_q =$) | HDKC #H0 Original request ratio ($r_{q0} =$) | HDKC #H5 Original request ratio ($r_{q5} =$) | HDKC #H9 Original request ratio ($r_{q9} =$) | Total request ratio |
|---|---|---|---|---|---|
| 0 | $V_0 = 200.00$ | $r_{00} = 0.40$ | $r_{05} = 0.30$ | $r_{09} = 0.15$ | 0.85 |
| 1 | $V_1 = 300.00$ | $r_{10} = 0.15$ | $r_{15} = 0.25$ | $r_{19} = 0.30$ | 0.70 |
| 2 | $V_2 = 150.00$ | $r_{20} = 0.10$ | $r_{25} = 0.10$ | $r_{29} = 0.20$ | 0.40 |
| 3 | $V_3 = 100.00$ | $r_{30} = 0.30$ | $r_{35} = 0.15$ | $r_{39} = 0.20$ | 0.65 |
| 4 | $V_4 = 250.00$ | $r_{40} = 0.05$ | $r_{45} = 0.20$ | $r_{49} = 0.15$ | 0.40 |
|  | $\sum V_q = 1000.00$ | $\sum r_{q0} = 1.00$ | $\sum r_{q5} = 1.00$ | $\sum r_{q9} = 1.00$ | 3.00 |

FIG. 16B

| LU ID ($q=$) | Unused capacity ($V_q =$) | HDKC #H0 Processed request ratio ($R_{q0} =$) | HDKC #H5 Processed request ratio ($R_{q5} =$) | HDKC #H9 Processed request ratio ($R_{q9} =$) | Total processed request ratio ($K_q =$) |
|---|---|---|---|---|---|
| 0 | $V_0 = 200.00$ | $R_{00} = 0.24$ | $R_{05} = 0.12$ | $R_{09} = 0.03$ | $K_0 = 0.39$ |
| 1 | $V_1 = 300.00$ | $R_{10} = 0.09$ | $R_{15} = 0.10$ | $R_{19} = 0.06$ | $K_1 = 0.25$ |
| 2 | $V_2 = 150.00$ | $R_{20} = 0.06$ | $R_{25} = 0.04$ | $R_{29} = 0.04$ | $K_2 = 0.14$ |
| 3 | $V_3 = 100.00$ | $R_{30} = 0.18$ | $R_{35} = 0.06$ | $R_{39} = 0.04$ | $K_3 = 0.28$ |
| 4 | $V_4 = 250.00$ | $R_{40} = 0.03$ | $R_{45} = 0.08$ | $R_{49} = 0.03$ | $K_4 = 0.14$ |
|  | $\sum V_q = 1000.00$ | $\sum R_{q0} = 0.60$ | $\sum R_{q5} = 0.40$ | $\sum R_{q9} = 0.20$ | $\sum K_q = 1.20$ |

FIG. 17A

| LU ID (q=) | Unused capacity ($V_q$ =) | $V_q / K_q$ ($B_q$ =) | Minimal value of $B_q$ (X =) |
|---|---|---|---|
| 0 | $V_0$ = 200.00 | $B_0$ = 512.82 | X = 357.14 |
| 1 | $V_1$ = 300.00 | $B_1$ = 1200.00 | |
| 2 | $V_2$ = 150.00 | $B_2$ = 1071.43 | |
| 3 | $V_3$ = 100.00 | $B_3$ = 357.14 | |
| 4 | $V_4$ = 250.00 | $B_4$ = 1785.71 | |

FIG. 17B

| LU ID (q=) | Unused capacity ($V_q$ =) | HDKC #H0 Reserved capacity ($G_{q0}$ =) | HDKC #H5 Reserved capacity ($G_{q5}$ =) | HDKC #H9 Reserved capacity ($G_{q9}$ =) | Total ($Z_q = \Sigma G_{qp}$) | Remaining capacity ($U_q = V_q - Z_q$) |
|---|---|---|---|---|---|---|
| 0 | $V_0$ = 200.00 | $G_{00}$ = 85.71 | $G_{05}$ = 42.86 | $G_{09}$ = 10.71 | $Z_0$ = 139.29 | $U_0$ = 60.71 |
| 1 | $V_1$ = 300.00 | $G_{10}$ = 32.14 | $G_{15}$ = 35.71 | $G_{19}$ = 21.43 | $Z_1$ = 89.29 | $U_1$ = 210.71 |
| 2 | $V_2$ = 150.00 | $G_{20}$ = 21.43 | $G_{25}$ = 14.29 | $G_{29}$ = 14.29 | $Z_2$ = 50.00 | $U_2$ = 100.00 |
| 3 | $V_3$ = 100.00 | $G_{30}$ = 64.29 | $G_{35}$ = 21.43 | $G_{39}$ = 14.29 | $Z_3$ = 100.00 | $U_3$ = 0.00 |
| 4 | $V_4$ = 250.00 | $G_{40}$ = 10.71 | $G_{45}$ = 28.57 | $G_{49}$ = 10.71 | $Z_4$ = 50.00 | $U_4$ = 200.00 |
| | $\Sigma V_q$ = 1000.00 | $\Sigma G_{q0}$ = $Y_0$ = 214.29 | $\Sigma G_{q5}$ = $Y_5$ = 142.86 | $\Sigma G_{q9}$ = $Y_9$ = 71.43 | $\Sigma Z_q$ = 428.57 | $\Sigma U_q$ = 571.43 |

When $\Sigma G_{qp}$ is insufficient, exclude LU #3 and recompute

When any $\Sigma U_q$ is less than 0, exclude LU #3 and recompute

STORAGE SYSTEM COMPRISING MULTIPLE STORAGE CONTROL APPARATUS

TECHNICAL FIELD

The present invention relates to a storage control apparatus unit, and a storage system that comprises multiple storage control apparatus units. Furthermore, the present invention can cite the specifications and drawings of U.S. patent application Ser. No. 12/918,608 (and/or PCT/JP 2010/004621) (Matsui et al.), and U.S. patent application Ser. No. 13/061, 291 (and/or PCT/JP 2011/000009) (Mizuta et al.) at least in the United States.

BACKGROUND ART

For example, in Patent Literature 1, there is disclosed a technology in which a low-performance disk array system is coupled to a high-performance disk array system, the high-performance disk array system virtualizes a logical volume inside the low-performance disk array system and provides this logical volume to a host device.

Furthermore, in Patent Literature 2, there is disclosed multiple intercoupled RAID (Redundant Array of Independent (or Inexpensive) Disks) controllers, and a technique for transferring data between multiple RAID controllers Citation List Patent Literature

[PTL 1]

U.S. Pat. No. 7,441,095

[PTL 2]

U.S. Pat. No. 6,658,478

SUMMARY OF INVENTION

Technical Problem

But this literature does not take into account the differences in performance between multiple storage apparatuses, the distance between multiple storage apparatuses, and so forth.

Moreover, for example, using the same design for expansion in a case where a storage control apparatus comprising the same level of performance and/or functionality as an existing storage control apparatus (hereinafter, the existing apparatus) is added to this existing apparatus and in a case where a storage control apparatus comprising a different level of performance and/or functionality from this existing apparatus is added to this existing apparatus results in unnecessary load and waste being placed on the performance and/or functionality of the individual storage control apparatuses, raising the likelihood of a situation in which it is not possible to realize the performance and/or functionality appropriate for the system comprising the multiple storage control apparatuses as a whole.

Furthermore, for example, when installation space restrictions are taken into account, there also arises the need to construct a second data center by adding a storage control apparatus to a site other than a first data center where the existing apparatus is disposed. Since the distance between the sites can impact performance in this case, expansion that uses the same design as a case in which a storage control apparatus is added to the same site is likely to result in user-required performance not being met.

This is not only a problem at expansion time, but rather is a common problem that must also be taken into account at the time of an initial configuration that utilizes multiple storage control apparatuses.

Furthermore, for example, in a case where the respective storage control apparatuses are arranged in different sites, in prior art, the user (for example, the user who accesses data stored in a storage control apparatus) has been aware of the distance between sites, resulting in a system configuration that lacks flexibility.

Therefore, an object of the present invention is to provide a storage system in which the difference in performance and/or functionality between multiple storage control apparatuses, and the distance between multiple storage control apparatuses, and so forth are taken into account.

Furthermore, another object of the present invention is to flexibly configure a system that comprises multiple storage control apparatuses.

Solution to Problem

A storage system comprises two or more first storage control apparatuses and a second storage control apparatus. The two or more first storage control apparatuses comprise two or more virtual volumes, and two or more storage devices. Each virtual volume is a virtual logical volume which conforms to Thin Provisioning, and is partitioned into two or more virtual areas. A pool, which is a storage area configured by two or more storage devices, is formed. Each storage device is partitioned into two or more actual areas. That is, the pool is configured from multiple actual areas. The first storage control apparatus is configured so as to carry out the processing of (A) through (C) below:

(A) receiving a write command, which specifies a virtual volume of this first storage control apparatus;

(B) allocating an actual area from the pool to a write-destination virtual area identified on the basis of the write command received in the (A) in a case where an actual area has not been allocated to this write-destination virtual area; and (C) writing write-targeted data according to the above-mentioned write command to the actual area allocated to the write-destination virtual area.

The second storage control apparatus carries out the processing of (a) and (b) below either one or multiple times:

(a) determining, for each storage device, an unused capacity to be given to the first storage control apparatus with respect to each first storage control apparatus based on the unused capacity of each storage device and a request value of each storage device for each first storage control apparatus; and (b) giving, for each first storage control apparatus, the unused capacity of each storage device determined with respect to the first storage control apparatus, to this first storage control apparatus.

The first time this processing is carried out, for example, is prior to the operation of the storage system, more specifically, is prior to either first storage control apparatus receiving a write command specifying either virtual volume. The second and subsequent times, for example, are after one or more actual areas have been allocated to one or more virtual volumes. The process, which includes the above-mentioned (a) and (b), may be carried out either regularly or irregularly.

The request value of the storage device is based on a performance value, which is a value related to a performance of this storage device.

A total capacity of the multiple actual areas allocated to one or more virtual volumes of the first storage control apparatus by this first storage control apparatus subsequent to the recent time at which the above-mentioned (a) and (b) are carried out, is equal to or less than the unused capacity given with respect to each storage device in the above-mentioned (b) at the recent time.

The second storage control apparatus may be either one of the two or more first storage control apparatuses (for example, the master HDKC #H0, which will be described further below), or may be a computer for communicating with at least one of the two or more first storage control apparatuses (for example, a management computer 701, which will be described further below). The first storage control apparatus, for example, may be a HDKC, which will be described further below.

BRIEF DESCRIPTION OF DRAWINGS

FIG. 2 shows two HDKC (high performance and/or high functionality storage control apparatuses (DKC (Disk Control Apparatus)) coupled in accordance with a first coupling mode.

FIG. 9 shows an example of the configuration of a virtual page management table 325 (for example #H0).

FIG. 10A shows an example of the configuration of a tier management table 321 (for example, #H0); and FIG. 10B shows an example of the relationship between a performance factor and a point score (an element of a tier level) thereof used in the table shown in FIG. 10A.

FIG. 11 shows an example of the configuration of a LU mapping table 322 (for example, #H0).

FIG. 12A shows an example of the configuration of an actual page management table 326 (for example, #H0); and FIG. 12B shows an example of the configuration of a queue management table 327 (#H0).

FIG. 13A shows an example of the configuration of a request ratio table 323 (#H0); FIG. 13B shows an example of the configuration of a request ratio table 323 (#H5); and FIG. 13C shows an example of the configuration of a request ratio table 323 (#H9).

FIG. 14A shows an example of the configuration of an unused capacity management table 329 (for example, #H0); and FIG. 14B shows an example of the configuration of a detailed unused capacity management table 330 (for example, #H0).

FIG. 15A shows an example of a utilization ratio corresponding to each HDKC; and FIG. 15B shows an example of an unused capacity $V_q$ corresponding to each pool LU #q.

FIG. 16A shows an example of an original request ratio $r_{qp}$ for each HDKC #Hp corresponding to each pool LU #q; and FIG. 16B shows an example of a processed request ratio $R_{qp}$ for each HDKC #Hp corresponding to each pool LU #q. FIG. 17A shows an example of a value $B_q$ based on the unused capacity $V_q$ and the processed request ratio $R_{qp}$ corresponding to each pool LU #q; and FIG. 17B shows an example of a temporary reserved capacity reserved for each HDKC #Hp from each pool LU #q.

DESCRIPTION OF EMBODIMENTS

An embodiment of the present invention will be explained below.

In the following explanation, various types of information will be explained using the expression "xxx table", but these various types of information may be expressed using a data structure other than a table. To show that the information is not dependent on the data structure, "xxx table" may be called "xxx information".

Further, an ID (identifier), a number or the like will be used as information for identifying some target in the following explanation, but identification is not limited to this, and other types of identification information may also be used.

In the following explanation, there may be instances when "program" is used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the processing may also be the processor. The processor may comprise a hardware circuit for processing either all or a portion of a process performed by the processor. A computer program may be installed in respective computers from a program source. The program source, for example, may be a program delivery server or a storage medium.

<Configuration Storage System Related to an Embodiment of Present Invention>

Figure 1:
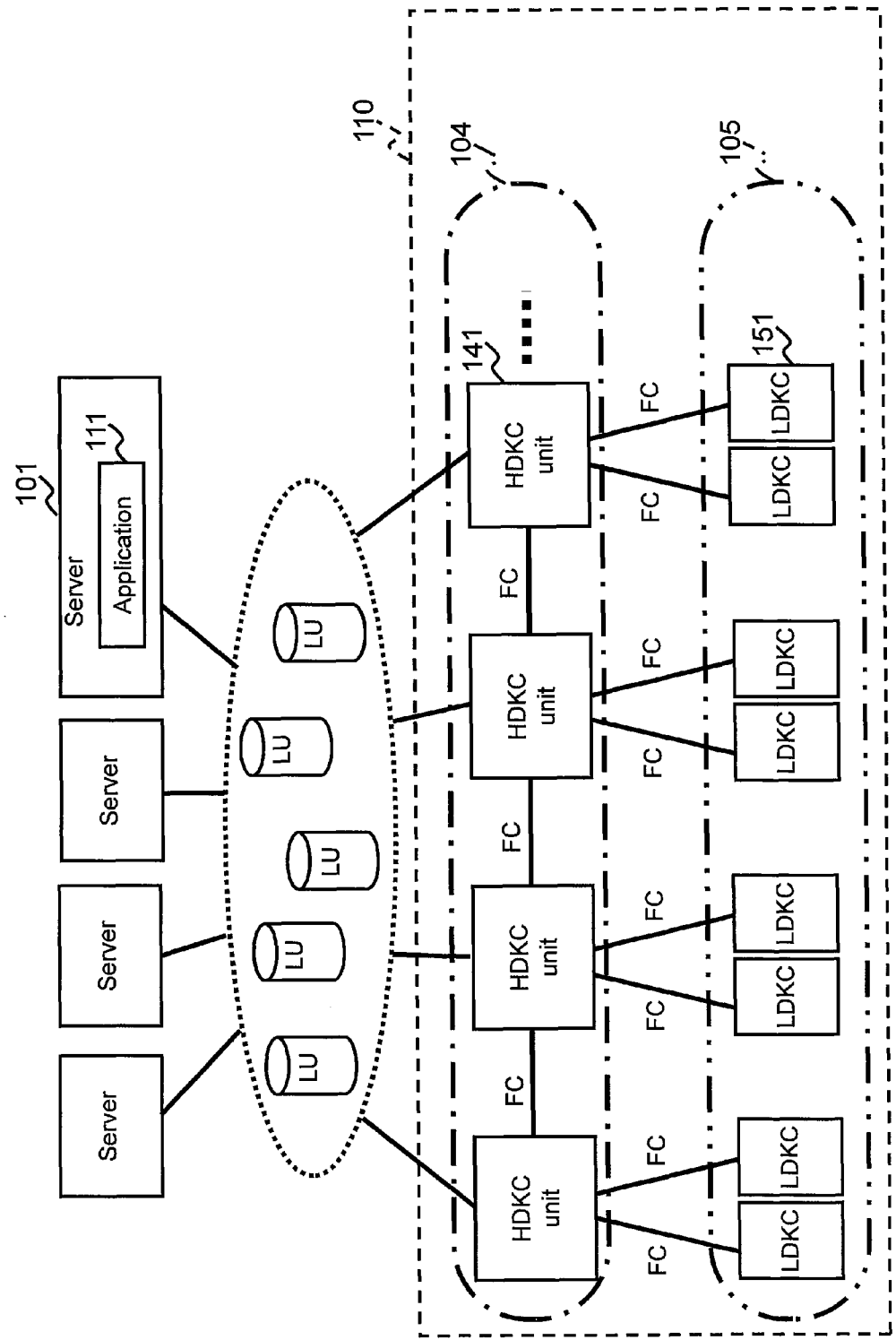
FIG. 1 shows the configuration of a storage system related to an embodiment of the present invention.

FIG. 1 shows the configuration of a storage system related to an embodiment of the present invention.

One or more servers 101 are coupled to a storage system 110. Each server 101, for example, is coupled to the storage system 110 via a communication network. The communication network, for example, is a FC (Fiber Channel) network, a LAN (Local Area Network), or the Internet.

The server 101 is one example of a host apparatus. The server 101, for example, comprises a communication interface device, which is coupled to the storage system 110, a storage resource, which stores a computer program, and a processor (typically a CPU (Central Processing Unit)), which is coupled to the communication interface device and the storage resource. The processor reads a computer program from the storage resource and executes this program. The computer programs are typically an OS (Operating System) and an application program 111. The application program 111 accesses a LU (Logical Unit) provided from the storage system 110. The LU is a logical storage device, and may be called a logical volume. Furthermore, either one or multiple servers 101 may comprise either one or multiple virtual servers inside the either one or multiple servers 101.

The storage system 110 comprises multiple storage control apparatuses. The storage control apparatus, for example, is an apparatus (for example, a disk array apparatus), which comprises a controller (hereinafter, the internal controller) that controls the storage of data in multiple physical storage mediums using RAID (Redundant Array of Inexpensive Disks) control. Since the physical storage medium may also be called a physical storage device, hereinafter this may be abbreviated as "PDEV" (Physical Device). The PDEV, for example, is a disk-type storage medium (for example, a HDD (Hard Disk Drive)). Accordingly, in the following explanation, the storage control apparatus may be called a disk control apparatus, and abbreviated as "DKC" (Disk Control Apparatus). In particular, a high-performance and/or high-functionality DKC may be called "HDKC" (High Performance and/or High Functionality DKC), a low-performance and/or low-functionality DKC (for example, a DKC with lower performance and/or lower functionality than the HDKC) may be called "LDKC" (Low Performance and/or Low Functionality DKC), and in a case where no particular distinction is made between the HDKC and the LDKC, the disk control apparatus may simply be called "DKC". The PDEV may be built into the HDKC and/or LDKC, or may be attached externally to the HDKC and/or the LDKC. In addition, the disk-type storage medium, for example, may also be a FC (Fiber Channel), a SAS (Serial Attached SCSI), an ATA (Advanced Technology Attachment), a SATA (Serial ATA) or other such drive. Furthermore, instead of a disk-type storage medium, the PDEV may also be another type of physical storage medium, such as, for example, a SSD (Solid State Drive), a semiconductor memory storage device/board, or the like.

The storage system 110 comprises a HDKC unit group 104, and a LDKC group 105, which is at a lower level than the HDKC unit group 104.

The HDKC unit group 104 comprises multiple HDKC units 141.

The HDKC unit 141 is configured from one or more HDKC. That is, the HDKC unit 141 may be the HDKC itself, or a set of multiple HDKCs. In the case of a HDKC unit 141 that is a set of multiple HDKCs, these multiple HDKCs, for example, are coupled in series. Two HDKCs are coupled to one another via a coupling medium (hereinafter, the internal bus) that enables short-distance coupling inside the HDKC unit 141. The internal bus, for example, is short, measuring a maximum of several meters in length. The internal bus, for example, is either a PCI bus or a PCI-Express (PCIe) bus. In this embodiment, the HDKC-to-HDKC coupling mode in the HDKC unit 141 is called the "first coupling mode". An internal bus according to the first coupling mode may be called the "first coupling medium" (or the first data transfer line).

Multiple HDKC units 141, for example, are coupled in series. An HDKC inside the HDKC unit 141 and an HDKC inside another HDKC unit 141 are coupled to one another via the long-distance coupling medium (hereinafter, the external bus). The external bus in this embodiment is a FC (Fiber Channel) cable, but a different coupling medium like FCoE (Fiber Channel over Ethernet) may be used instead. The coupling mode of an HDKC inside the HDKC unit 141 and an HDKC inside another HDKC unit 141 is called the "third coupling mode" in this embodiment. An external bus according to the third coupling mode may be called a "third coupling medium" (or a third data transfer line). Hereinbelow, in a case where a first HDKC is coupled to a second HDKC via the external bus (the third coupling medium) without going through another HDKC, the first HDKC is directly coupled to the second HDKC, and in a case where the first HDKC is coupled to the second HDKC via another HDKC and the external bus (the third coupling mode), the first HDKC and the second HDKC are indirectly coupled.

The LDKC group 105 comprises one or more LDKC 151. The LDKC 151 is coupled to the HDKC via the external bus. The coupling mode of the LDKC 151 and the HDKC in this embodiment is called the "second coupling mode". The external bus according to the second coupling mode may be called the "second coupling medium" (or the second data transfer line). The LDKC 151, for example, comprises multiple PDEV, and manages one or more LUs (Logical Units) based thereon. The LU is a logical storage device (a logical volume). The LU inside the LDKC is managed virtually as a LU inside the HDKC.

The server 101 is coupled to either one or multiple HDKCs via the external bus (a communication network), but the storage system 110 is able to perceive this as a single DKC that is virtually coupled to this server 101. Multiple LUs are provided to the server 101 from the HDKC (called the "target HDKC" in the explanation of FIG. 1) that is coupled to this server 101, but these multiple LUs, for example, may include at least one of (x1) through (x5) below.

(x1) A LU of the target HDKC.
(x2) A LU provided via the first coupling medium. That is, a LU of another HDKC inside the HDKC unit (the "target HDKC unit" in the explanation of FIG. 1) that comprises the target HDKC.
(x3) A LU provided via the third coupling medium. That is, a virtual LU mapped to a LU of another HDKC unit that is coupled either directly or indirectly to the target HDKC unit.
(x4) A LU provided via the second coupling medium. That is, virtual LU mapped to a LU of a LDKC unit that is coupled to the target HDKC unit.
(x5) A LU provided via the second coupling medium and the third coupling medium. That is, a virtual LU mapped to a virtual LU (a virtual LU that is mapped to a LU of a LDKC unit that is coupled to another HDKC unit) of another HDKC unit.

The capacity and/or number of units of PDEV mounted to the DKC generally increases. For this reason, the storage capacity that the DKC supports also generally increases.

However, the performance and/or functionality of the DKC internal controller do/does not improve proportional to the increase in the DKC-supported storage capacity.

There are also discrepancies in the requirements (storage capacity, performance, number of ports) placed on the DKC by the users who utilize the storage system.

In a case where the storage system is constructed to meet the needs of a high-end user, the storage system comprises too much performance and/or functionality, and, in addition, is too high priced for the low-end user. Even in a case where the storage system is gradually built up from a small-scale system to a larger one, there is still a tendency for the initial installation costs to be high.

According to Patent Literature 2 mentioned above, coupling multiple DKCs or internal controllers together via an internal bus makes it possible to enhance scalability. However, for example, this gives rise to the following problems.

(1) The distance between the DKCs and/or between the internal controllers must be short (for example, no longer than several meters). A case in which the storage system is to be scaled up requires a large space on the same site. Insufficient space means the system will not be able to be expanded.

(2) The number of DKCs and/or internal controllers capable of being coupled together is restricted by the type of interface.

In this embodiment, either instead of or in addition to the first coupling medium, the HDKCs are coupled using the third coupling medium (the external bus), which enables long-distance coupling, and multiple HDKCs coupled via the third coupling medium are treated virtually as a single DKC. For this reason, it is possible to install multiple HDKCs in respectively separate locations, doing away with the need for a large amount of space on the same site. Furthermore, since there are no particular restrictions on the number of DKCs that can be coupled together, scalability improves.

This makes it possible to provide a technology that enables the realization of a flexible and efficient scale-out from a small-scale configuration to a large-scale configuration while reducing the initial installation costs. Furthermore, flexibly and efficiently linking multiple storage control apparatuses (for example, a HDKC unit 141, a HDKC and/or a LDKC 151) installed at either the same or different sites is a necessary and important technology for constructing, controlling and/or managing flexible and efficient storage systems in a cloud environment.

The storage system 110 comprises either HDKCs or LDKCs, but can be perceived by the server 101 as a single DKC comprising multiple LUs. In accordance with this, even when an additional HDKC is added, the higher-level device with respect to the HDKC (for example, the server or a switch configuring a communication network) do not recognize the addition of the HDKC, but rather only the addition of a front-end communication port (hereinafter, the FE port). The FE port is a communication port of a HDKC and is coupled to a front-end device. The front-end device means a device located outside the HDKC and, for example, is a server, a switch inside a communication network, a HDKC coupled using the first coupling mode, a HDKC coupled using the third coupling mode, or a LDKC coupled using the second coupling mode.

Furthermore, the storage system may be perceived by the server 101 not as a single DKC, but rather as multiple DKCs. Also, in a case where a HDKC has been added, the server 101 may be aware of the fact that the HDKC has been added.

For the HDKC, "high performance and/or high functionality" may be performance that is higher than a first performance threshold and/or a prescribed type of functionality, or performance and/or functionality that are higher than the performance and/or functionality of another DKC (performance and/or functionality that are practically the same level as those of another DKC). Furthermore, the HDKC is not limited to a disk array apparatus, and may be another type of storage control apparatus (for example, an intelligent switch that comprises a storage virtualization function).

Technical objects related to the HDKC, for example, are (a) through (d) below.

(a) To provide a control method and a post-coupling utilization method for when multiple HDKCs are coupled;

(b) to provide a control method and a post-coupling utilization method for when a HDKC is similarly coupled to a site that differs from that of a certain HDKC;

(c) when coupling multiple HDKCs, to appropriately manage the tier levels and other such attributes of the LUs created in the HDKCs that are to be coupled and to provide an appropriate post-coupling utilization method in accordance with the coupling relationship and distance between the respective DKCs (a "tier" will be explained hereinbelow); and (d) when coupling a certain HDKC to other multiple HDKCs, to appropriately manage the tier levels and other such attributes of the LUs created for each of the other HDKCs and to provide an appropriate post-coupling utilization method in accordance with the differences in performance between these other multiple HDKCs and the distance from this certain HDKC.

For the LDKC, "low performance and/or low functionality" may be performance that is lower than a second performance threshold and/or a prescribed type of functionality, or performance and/or functionality that is lower than the performance and/or functionality of the other DKC (practically the same levels of performance and/or functionality as the other DKC). The second performance threshold may be equal to or lower than the first performance threshold. Furthermore, the LDKC is not limited to a disk array apparatus, but rather may be another type of storage control apparatus.

Technical objects related to the LDKC, for example, are (p) and (q) below.

(p) When coupling a certain HDKC and a LDKC, to appropriately manage the tier level and other such attributes of the LU created in the LDKC and to provide an appropriate post-coupling utilization method in accordance with the difference in performance and distance between the respective DKCs; and (q) when coupling a certain HDKC to multiple LDKC, to appropriately manage the tier levels and other such attributes of the LUs created for each LDKC and to provide an appropriate post-coupling utilization method in accordance with the difference in performance between these multiple LDKC and the distance from the HDKC.

The respective coupling modes will be explained next.

<First Coupling Mode>

FIG. 2 shows two HDKCs that have been coupled using the first coupling mode.

Reference signs and IDs have been assigned to the hardware elements in FIG. 2. In the following explanation, when making a distinction between elements of the same type, the elements will be represented by using the ID (for example, HDKC #H0), and when no particular distinction is made between same type elements, the elements will be represented using the reference signs (for example, HDKC 201).

The ID of the HDKC is a combination (a two-part sign) of an alphabet letter "H" and a single digit numeral, but in a case where the HDKC includes multiple hardware elements of the same type, the multiple hardware elements of the same type may be distinguished using a three-part sign (ID) that includes this HDKC ID in the higher level. Specifically, for example, the IDs of the two CPUs of the HDKC #H0 are H00 and H01. Furthermore, in a case where "CPU #H0" is used as an inclusive code, CPU #H0 is at least one of CPU #H00 and #H01. This is not limited to the CPU, but rather holds true for the other types of hardware elements as well.

The HDKC 201 can be broadly divided into a PDEV group and an internal controller.

The PDEV group comprises one or more RG 231. The RG 231 is a RAID (Redundant Array of Independent (or Inexpensive) Disks) group, and is configured from two or more PDEV.

The internal controller, for example, is configured from two controller modules 211. There may also be one, or three or more controller modules 211 in a single HDKC 201.

The controller module 211 comprises a front interface (F-I/F) 221, a backend interface (B-I/F) 225, a cache memory (CM) 224, a CPU 222, a switch (SW) 226, and a local memory (LM) 223.

The F-I/F 221 is a communication interface device that couples to the server 101. The F-I/F 221 comprises either one or multiple higher-level ports. The higher-level port is a communication port that couples to a higher-level device, such as a server or a switch.

The B-I/F 225 is a communication interface device that couples to one or more RG 231.

The CM 224 temporarily stores data that is to be written to the RG 231 and data that has been read from the RG 231. At least one CM 224 may comprise a storage area that is used as the shared memory (SM) of multiple controller modules (an SM area) in addition to a storage area that is used as the cache memory (CM area).

The LM 223 may store information to be used in the CPU 222 and a computer program to be executed by the CPU 222. The LM 223 is coupled to the CPU 222 and is not coupled to the SW 226, but the LM 223 may also be coupled to the SW 226.

The CPU 222 is able to execute a computer program (hereinafter, the control program) that is stored in the LM 223. The control program may be stored in another storage resource either instead of or in addition to the LM 223.

The SW 226 is coupled to the F-I/F 221, the CPU 222, the CM 224, the B-I/F 225, and the SW 226 inside the nearest other controller module 211. The SW 226 switches the connections between these elements. The interface between the SW 226 and the respective elements, for example, is PCI-Express (PCIe).

Two SWs 226 (for example SW #H00 and #H01) inside two controller modules 211 are coupled via an internal bus 227 in a single HDKC. Similarly, two SWs 226 (SW #H01 and #H10) inside separate HDKCs #H0 and #1, which are coupled using the first coupling mode, are coupled via the internal bus 227.

In accordance with this configuration, it is possible to make shared use of the hardware elements inside multiple controller modules 211 and the RG 231 inside multiple HDKCs 201 in the HDKC unit 141. In addition, management information (for example, one or more tables that will be explained hereinbelow) inside the multiple HDKCs 201 may also be shared. For this reason, it is possible to manage the information of multiple HDKCs 201 using a single internal controller (or one controller module), and the HDKC unit 141 is able to behave like a single HDKC. For example, the CPU #H01 is able to access any of the CMs #H00, #H10 and #H11 the same as accessing the CM #H01. In addition, the CPU #H01 is also able to perform I/O (Input/Output) with respect to any of RGs #H10 through #H14 the same as it performs I/O with respect to the RGs #H00 through #14.

Specifically, for example, in a case where the controller module 211, which receives a write command with respect to the LU corresponding to a specified LUN (Logical Unit Number) from the server 101, and the write-destination RG 231 according to this write command are inside the same HDKC 201, data may be written to the RG 231 using the flow indicated by the dashed-dotted line. That is, the controller module #H00 that received the write command (it may also be a different controller module) writes the data to the CM #H00 (may also be a different CM), and writes the data inside the CM #H00 to the write-destination RG #H01. Furthermore, the present invention is not limited to this process, and a different controller module than the controller module that received the I/O command may perform the I/O with respect to the I/O-destination RG.

Further, for example, in a case where the controller module 211, which receives the write command, and this write-destination RG 231 are inside different HDKCs 201, the data may be written to the RG 231 using the flow indicated by the dotted line. That is, the controller module #H01 that received the write command (may also be another controller module) may write the data to the CM #H10 (may also be another CM) by way of the SWs #H01 and #H10, and the controller module #H10 (may also be another controller module) may write the data inside the CM #H10 to the write-destination RG #H13 by way of the SWs #H10 and #11.

Furthermore, the LU that provides the HDKC unit 141 to the server 101 may be a virtual LU according to Thin Provisioning.

When a controller module inside one HDKC accesses a controller module or RG inside another HDKC, there is no need to reference the LU mapping table, which will be explained hereinbelow. This is because each controller module in the HDKC unit is able to access the hardware elements (for example, the CM and the RG) inside a different HDKC from the HDKC that comprises this controller module the same as if the hardware elements were inside this controller module's HDKC.

As described above, since the controller modules and HDKCs in the HDKC unit 141 are coupled via an internal bus, the distance between the controller modules and the distance between the HDKCs are short compared with a case of external bus coupling.

The preceding has been an explanation of the first coupling mode. Furthermore, the LDKC may also comprise an internal controller and a PDEV group. The configuration of the LDKC may be same configuration as that of the HDKC. The configuration of the internal controller of the LDKC may differ from the configuration of the HDKC internal controller.

In the United States, U.S. Pat. No. 7,587,551 (Fujibayashi et al.) and/or US Patent Application Publication No. 2008/0263190 (Serizawa et al.) (specification and drawings) are cited in relation to the first coupling mode. The storage apparatus disclosed in at least one of these publications may be applied to the HDKC and/or HDKC unit.

<Second Coupling Mode>

Figure 3:
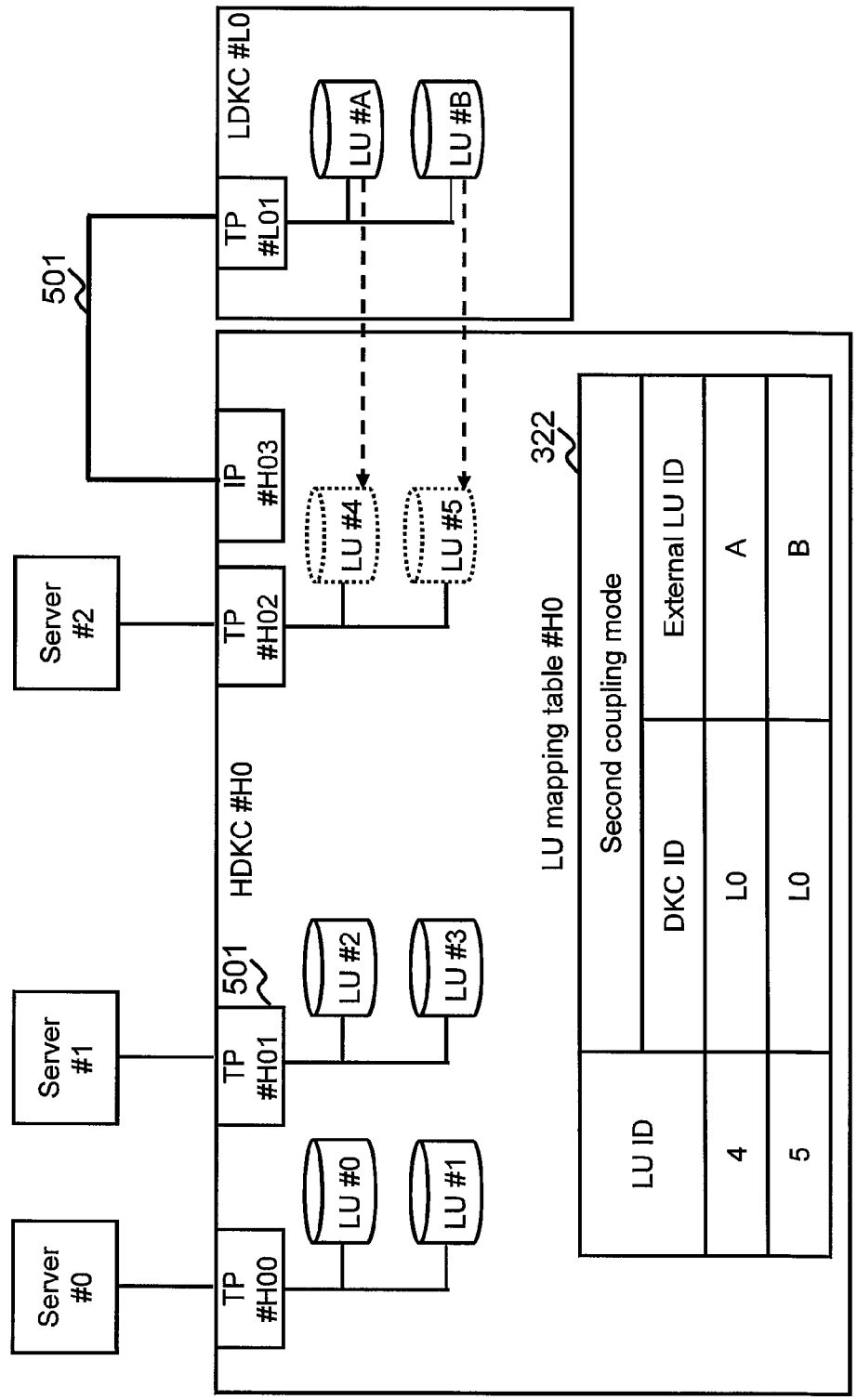
FIG. 3 shows an example of LU (Logical Unit) mapping in accordance with a second coupling mode.

FIG. 3 shows an example of LU mapping according to the second coupling mode. Hereinbelow, the HDKC and its elements and the LDKC and its elements may be explained using element IDs instead of reference signs. Also, in the following explanation, the internal controller of the DKC #x may be referred to as "internal controller #x". Furthermore, a LU in the second DKC, which is mapped in accordance with either the second or the third coupling mode to a LU in the first DKC, may be called an "external LU".

The DKC internal controller comprises multiple FE ports (Front-end communication ports) 501. The multiple FE ports 501 may comprise at least one of an FE port that becomes an initiator (the initiator port), an FE port that becomes the target (the target port), and an FE port that becomes both the initiator and the target (the initiator/target port). Hereinbelow, the initiator port may be expressed as "IP", the target port may be expressed as "TP", and the initiator/target port may be expressed as "ITP" as in the drawings. The FE port is in the F-I/F (refer to FIG. 2) of the HDKC.

A server (for example, #0) couples to the target port (for example, #H00) of the HDKC #H0. Two or more servers may be coupled to one target port.

The initiator port #H03 of the HDKC #H0 couples to the LDKC #L0 (#L01 is the target port thereof). The LDKC #L0 comprises LUs #A and #B. At least one of the LUs #A and #B may be a virtual LU according to Thin Provisioning. Thin Provisioning may also be called Dynamic Provisioning. Accordingly, a virtual LU according to Thin Provisioning may be referred to as "DP-LU" hereinbelow.

The LUs #4 and #5 are associated with the target port #H02, and the server #02 is coupled to the target port #H02. The server #02 is able to issue an I/O command that specifies LU #4 and/or #5.

External LU #A is mapped to LU #4, and external LU #B is mapped to LU #5. That is, LUs #4 and #B are virtual LUs.

According to the second coupling mode, the HDKC #H0 is able to treat the external LUs #A and #B inside the LDKC #L0 that is coupled to the initiator port #H03 virtually as LUs #4 and #5. The corresponding relationship between virtual LU #4 (#5) and external LU #A (#B) can be identified from the LU mapping table 322 (#H0). The LU mapping table 322 (#H0) comprises information related to the external LUs that are mapped to the virtual LUs inside the HDKCs that comprise this table. Specifically, the LU mapping table #0 comprises the following information for each virtual LU:

The ID of the DKC that comprises an external LU mapped to a virtual LU; and
the ID of this external LU.

The LU mapping table #H0 is stored in a storage resource (for example, the LM or the CM) inside the internal controller #H0. In a case where the LU #4 has been specified by an I/O command from the server #2, the internal controller #H0 (CPU#H0 (either CPU #H00 or #H01)) identifies the fact that the LU #A is mapped to the LU #4 from the LU mapping table #H0, and sends the I/O command specifying the identified LU #A to the LDKC #L0. This enables the I/O to be performed with respect to the LU #4 (LU #A).

Furthermore, the external LU mapped to one virtual LU is not limited to one external LU of one LDKC, but rather multiple external LUs of one LDKC, and either one or multiple external LUs provided from respective LDKCs (multiple external LUs provided across multiple LDKCs) may be mapped to a single virtual LU. In these cases, multiple external LU IDs are included in the ID of the above-mentioned external LU.

According to the second coupling mode, the HDKC #H0 may treat the LDKC #L0 the same as the PDEV of the HDKC #H0. A server may or may not be coupled to the FE port of the LDKC #L0. According to the second coupling mode, although the HDKC #H0 comprises a virtual LU to which the LU inside the LDKC #L0 is mapped, the LDKC #L0 does not comprise a virtual LU to which the LU inside the HDKC #H0 is mapped.

According to the second coupling mode, the virtual LUs #4 and #5 have more overhead than the LU (for example, LU#0) based on the RG inside the HDKC #H0 due to the fact that access is by way of the external bus 501 (the external bus 501 may go by way of an external switch (for example, a FC (Fiber Channel)) switch). For this reason, the virtual LUs #4 and #5 may be used as a lower tier (for example, either a mid-level tier or a lower-level tier) that is lower than the LU based on the RG inside the HDKC #H0. Furthermore, in a second embodiment, which will be explained below, load distribution is performed, but a virtual LU according to the second coupling mode, for example, may be a load distribution-source LU (a data migration-source LU) belonging to the mid-level tier and/or the lower-level tier, and/or a load distribution-destination LU (a data migration-destination LU) belonging to the mid-level tier and/or the lower-level tier. In a load distribution, for example, in a case where a virtual LU has been migrated from a first HDKC to a second HDKC by way of the third coupling medium, the data inside a first external LU (the LU inside a first LDKC) that is mapped to this virtual LU may be migrated to a second LU (the LU mapped to the virtual LU inside the second HDKC) inside a second LDKC that is coupled to the second HDKC.

Also, for example, an external LU (a LU inside the LDKC), which has been mapped according to the second coupling mode, may be mapped to at least one of the LU configuring a pool inside the HDKC #H0. Therefore, at least one of the one or more LUs (pool LUs) configuring the pool may be a virtual LU. The HDKC #H0 may comprise a DP-LU (a virtual LU according to Dynamic Provisioning). In a case where data is to be written to a certain virtual page inside the DP-LU, the HDKC #H0 is able to allocate an actual page from the pool to this virtual page. The HDKC #H0 is able to write the data to the actual page. In a case where the virtual LU to which the external LU inside the LDKC #L0 is mapped comprises this actual page, the data to be written to the actual page is written to a storage area inside the external LU corresponding to this actual page.

Furthermore, a HDKC may be coupled to a HDKC by way of the second coupling medium either instead of or in addition to the LDKC.

Furthermore, the same one or multiple LDKCs may be coupled to multiple HDKCs 201 in one HDKC unit 141. In accordance with this, each of the multiple HDKCs in the one HDKC unit 141 may provide to either one or multiple servers 101 multiple virtual volumes (the first virtual LU and the second virtual LU) to which is mapped this same LU (the first LU) by using the same LU (first LU) in the same either one or multiple LDKCs. Each of the multiple HDKCs in the one HDKC unit 141 may also provide to either one or multiple servers 101 different virtual volumes (the third virtual LU and the fourth virtual LU) to which are respectively mapped different LUs (the second LU and the third LU) by using these different LUs (the second LU and the third LU) in the same either one or multiple LDKCs.

Of these, in a case where each of the multiple HDKCs in the one HDKC unit 141 provide to either one or multiple servers 101 multiple virtual volumes (the first virtual LU and the second virtual LU) to which the same LU (the first LU) is mapped, these multiple virtual volumes (the first virtual LU and the second virtual LU) are used for either a failover or a load distribution.

As a concrete example of the use of these multiple virtual volumes in a failover, the multiple HDKCs in the one HDKC unit 141 and/or the management device (device which manages respective HDKCs) manage(s) both an active ordinary path for reading and/or writing the data of the first LU from either one or multiple servers 101 via the first virtual LU, and either an active or a passive alternate path for reading and/or writing the data of the first LU from the either one or multiple servers 101 via the second virtual LU, implement(s) a data write to the first LU and/or a data read from the first LU by processing a write command and/or a read command sent from the either one or multiple servers 101 using the above-mentioned alternate path in accordance with the failure of the above-mentioned ordinary path, and return(s) a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 via the above-mentioned ordinary path and/or alternate path, the multiple HDKCs in the one HDKC unit 141 may implement a data write to the first LU and/or a data read from the first LU. In the US, the specifications and drawings of U.S. Pat. No. 7,337,350 (Mimatsu et al.) may be cited with respect to this specific processing. In this case, the technology of the present application is applied such that the Host Computer of these specifications and drawings corresponds to the either one or multiple servers 101 of the present application, the Storage System 2 and the Storage System 3 of these specifications and drawings respectively correspond to the multiple HDKCs in the one HDKC unit 141 of the present application, and the Storage System 1 of these specifications and drawings corresponds to the LDKC comprising the same LU (the first LU) of the present application.

Further, the following can be cited as a concrete example of the use of these multiple virtual volumes in a load distribution. The multiple HDKCs in the one HDKC unit 141 and/or the management device manage(s) both a path for reading and/or writing the data of the first LU from either one or multiple servers 101 by way of the first virtual LU and a path for reading and/or writing the data of the first LU from either one or multiple servers 101 by way of the second virtual LU, and in accordance with the respective loads of the multiple HDKCs in the one HDKC unit 141, change(s) the processing that had been implemented using the one path of the above-mentioned multiple paths such that the processing is implemented using the other path of the above-mentioned multiple paths. The processing referred to here is for implementing a data write to the first LU and/or a data read from the first LU by processing a write command and/or a read command sent from the either one or multiple servers 101 and returning a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 by way of the above-mentioned multiple paths, the multiple HDKCs in the one HDKC unit 141 may implement a data write to the first LU and/or a data read from the first LU. In the US, the specifications and drawings of US Patent Application Publication No. 2006/0271758 (Innan et al.) may be cited with respect to this specific processing. In this case, the technology of the present application is applied such that the Host Device of these specifications and drawings corresponds to the either one or multiple servers 101 of the present application, the Virtualization Storage Device 1 and the Virtualization Storage Device 2 of these specifications and drawings respectively correspond to the multiple HDKCs in the one HDKC unit 141 of the present application, and the External Storage Device of these specifications and drawings corresponds to the LDKC comprising the same LU (the first LU) of the present application. Furthermore, in a case where multiple servers 101 are used in the specific examples of using the multiple virtual volumes in either a failover or a load distribution, these multiple servers 101 may correspond to servers included in a cluster relationship, in which case the processing is passed between the multiple servers 101 when either using the above-mentioned failover alternate path or using the above-mentioned load distribution other path.

At this time, either the one or multiple servers 101 may correspond to either the one or multiple virtual servers in the either one or multiple servers 101. In a case where one virtual server is used between the either one or multiple servers 101, the virtual server is migrated between the either one or multiple servers 101 when either using the above-mentioned failover alternate path or using the above-mentioned load distribution other path. In a case where multiple virtual servers are used between the either one or multiple servers 101, processing is passed between the multiple virtual servers of the either one or multiple servers 101 when either using the above-mentioned failover alternate path or using the above-mentioned load distribution other path. In this case, the failover or the load distribution may be implemented by the HDKC unit 141 or the management device determining or deciding which of the multiple HDKCs is to be the Source or the Destination of the failover or the load distribution in accordance with the performance, status (presence or absence of a failure, extent of a failure, and so forth) and/or the load of each of the multiple HDKCs in the one HDKC unit 141, or the differences in the performance, the differences in the status (presence or absence of a failure, the extent of the failure, and so forth) and the differences in the distance and/or load between the multiple HDKCs. Furthermore, the above-mentioned distance is not limited to an actual distance, but rather may be a command transceiving time, a command response time and/or a command processing time.

Furthermore, either the same one or multiple LDKCs may be coupled to multiple HDKC units 141. In this case as well, the same mode, concrete example, and citations will be applied as in the case where either the same one or multiple LDKCs is/are coupled to the multiple HDKCs 201 in the one HDKC unit 141. However, the multiple HDKCs in the one HDKC unit 141 are re-read and applied to multiple HDKC units 141. In this case, the failover or load distribution is implemented by the multiple HDKC units 141 or the management device determining or deciding which one of the multiple HDKC units 141 is to be the Source (a failover source or a load distribution source) or the Destination (the failover destination or the load distribution destination) of the failover or the load distribution in accordance with the performance, status (presence or absence of a failure, extent of a failure, and so forth) and/or the load of each of the multiple HDKC units 141, or the differences in the performance, the differences in the status (presence or absence of a failure, the extent of the failure, and so forth) and the differences in the distance and/or load between the multiple HDKC units 141. Furthermore, the above-mentioned distance is not limited to an actual distance, but rather may be a command transceiving time, a command response time and/or a command processing time (these will be explained in detail using the portion of the specifications corresponding to FIG. 10). Furthermore, in a case where the above-mentioned either one or multiple LDKCs is/are coupled to the multiple HDKCs 201 in the one HDKC unit 141, whereas the HDKC unit 141 or the management device determines or decides (does not take into account the performance or distance) which one of the multiple HDKCs is to be the Source or the Destination of the failover or the load distribution in accordance with the status (presence or absence of a failure, extent of a failure, and so forth) and/or the load of each of the multiple HDKCs in the one HDKC unit 141, or the differences in the status (presence or absence of a failure, the extent of the failure, and so forth) and/or the differences in the load between the multiple HDKCs, in a case where either the same one or multiple LDKCs is/are coupled to multiple HDKC units 141, the HDKC unit 141 or the management device may exercise control so as to determine or decide which one of the multiple HDKC units 141 is to be the Source or the Destination of the failover or the load distribution in accordance with the performance, the status (presence or absence of a failure, extent of a failure, and so forth) and/or the load of each of the multiple HDKC units 141, or the differences in the performance, and the differences in the status (presence or absence of a failure, the extent of the failure, and so forth) and/or the differences in the load between the multiple HDKC units 141.

The specification and drawings of U.S. Pat. No. 7,441,095 (Tamura et al.) is cited in relation to the second coupling mode in the United States. In accordance with this, First Storage Controller corresponds to the HDKC unit 141 of the present specification, and Second Storage Controller corresponds to the LDKC 151 of the present specification.

<Third Coupling Mode>

Figure 4:
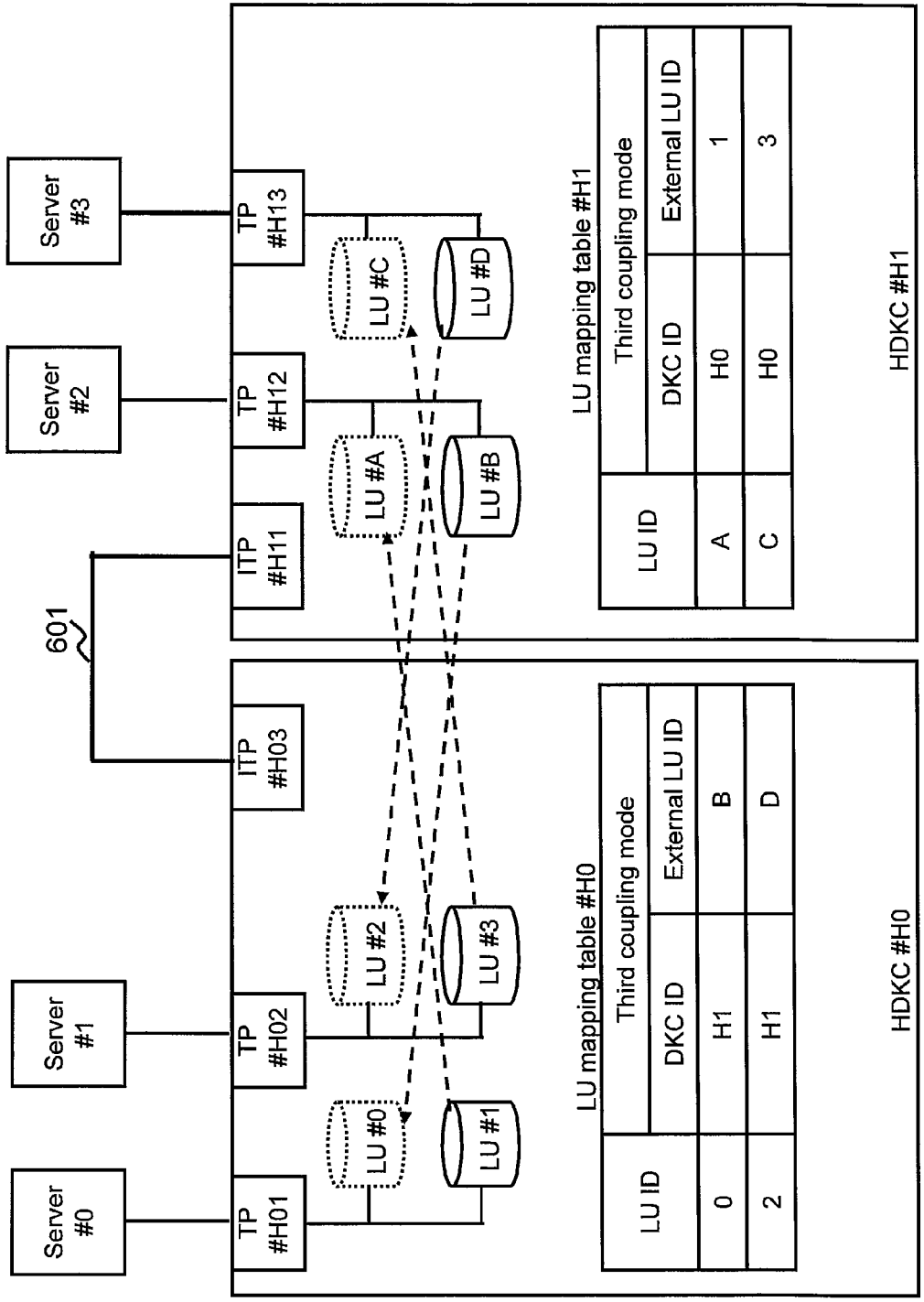
FIG. 4 shows a first example of LU mapping in accordance with a third coupling mode.

FIG. 4 shows a first example of LU mapping according to the third coupling mode.

The HDKCs #H0 and #1 comprise target ports and initiator/target ports as the FE ports. The FE port is in the F-I/F (refer to FIG. 2) as described hereinabove.

A server (for example, #0) is coupled to the target port (for example, #H01) of the HDKC #H0, and a server (for example, #2) is coupled to the target port (for example, #H12) of the HDKC #H1.

The initiator/target port #H03 of the HDKC #H0 and the initiator/target port #H11 of the HDKC #H1 are coupled via an external bus 601 (the external bus 601 may go by way of an external switch (for example, a FC (Fiber Channel)) switch). That is, according to the third coupling mode, the HDKC #H0 may issue an I/O command to the HDKC #H1, and the HDKC #H1 may issue an I/O command to the HDKC #H0. This is because, when a LU inside the HDKC #H0 is mapped to a virtual LU inside the HDKC #H1, a LU inside the HDKC #H1 is also mapped to a virtual LU inside the HDKC #H0. According to FIG. 4, the LU #1 is mapped to the virtual LU #A, and the LU #3 is mapped to the virtual LU #C. In addition, the LU #B is mapped to the virtual LU #0, and the LU #D is mapped to the virtual LU #2. According to FIG. 4, the virtual LUs and the LUs mapped to the virtual LUs are associated with the target ports.

The HDKC #H0 comprises the LU mapping table #H0, and the HDKC #H1 comprises the LU mapping table #H1. The LU mapping table #H0 comprises information related to the external LU #B (#D), which is mapped to the virtual LU #0 (#2) of the HDKC #H0. The LU mapping table #H1 comprises information related to the external LU #1 (#3), which is mapped to the virtual LU #A (#C) of the HDKC #H1. The external LU #B (#D), which is mapped to the virtual LU #0 (#2), is identifiable from the LU mapping table #H0, and the external LU #A (#C), which is mapped to the virtual LU #1 (#3), is also identifiable from the LU mapping table #H1.

The server to which the HDKCs #H0 and #H1 are coupled is able to perceive these HDKCs as if they were a single HDKC. For example, the server #0 is able to recognize the LUs #0 and #1 inside the HDKC #H0, but the LU #0 entity is actually LU #B, and it exists in HDKC #H1 rather than HDKC #H0. However, the server #0 recognizes LU #0 and does not recognize the LU #B, which is inside the HDKC #H1 and which is mapped to this LU #0. For example, in a case where the LU #0 is specified by an I/O command from the server #0, the internal controller #H0 (CPU #H0) identifies the fact that the LU #B is mapped to the LU #0 from the LU mapping table #H0, and sends the I/O command specifying the identified LU #B to the LDKC #H1. This enables the I/O to be performed with respect to the LU #0 (LU #B).

The virtual LUs #0, #2, #A and #C according to the third coupling mode may belong to a higher-level tier since they are mapped to the LUs inside the HDKC. The virtual LU according to the third coupling mode, for example, may be a load distribution-source LU (a data migration-source LU) belonging to the higher-level tier and/or a load distribution-destination LU (a data migration-destination LU) belonging to the higher-level tier. In the load distribution, for example, the data inside the LU that is mapped to the virtual LU may be migrated from the HDKC that comprises this LU to the LU of another HDKC by way of the third coupling medium.

Figure 5:
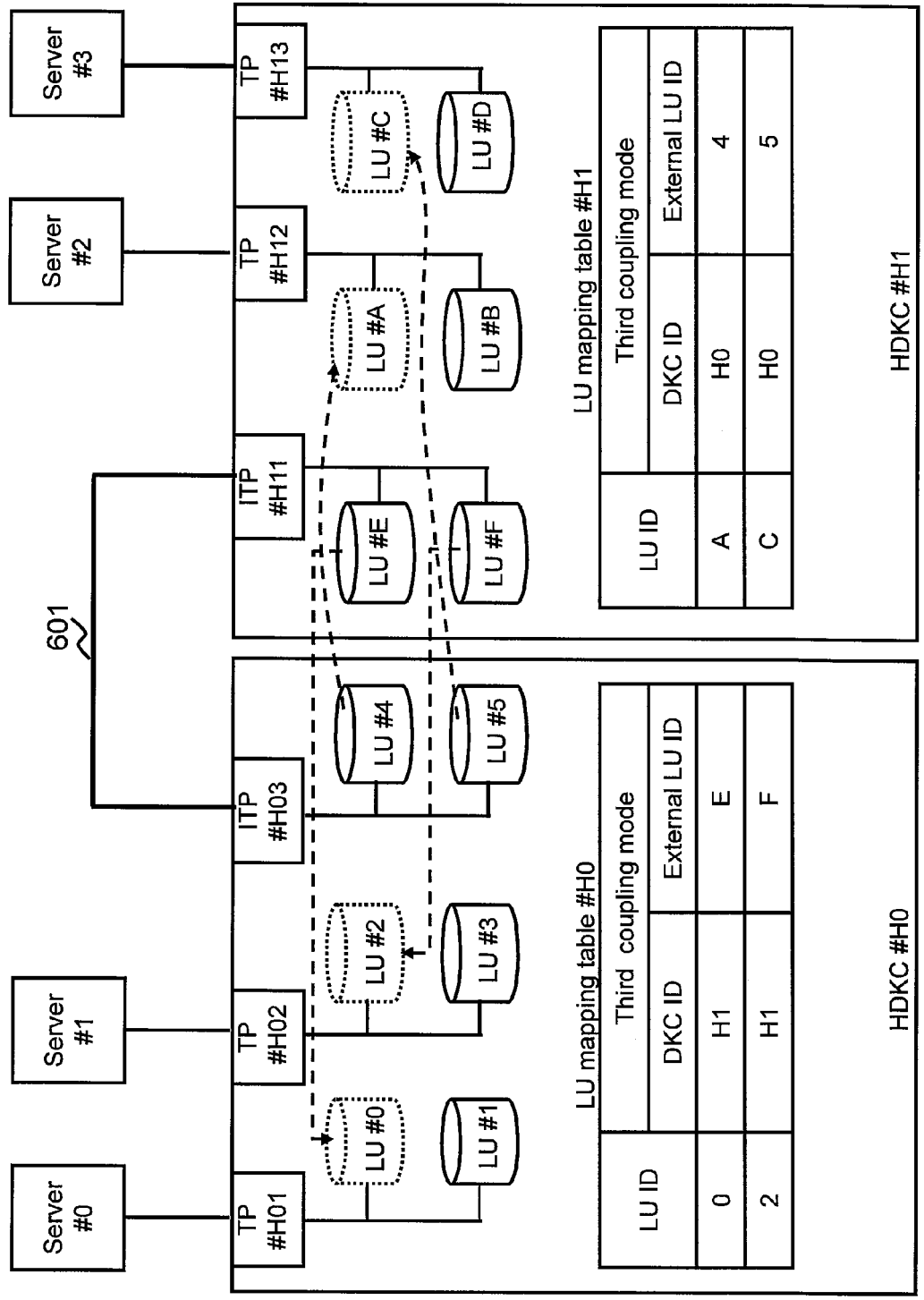
FIG. 5 shows a second example of LU mapping in accordance with a third coupling mode.

FIG. 5 shows a second example of LU mapping according to the third coupling mode.

As shown in FIG. 5, the external LU (for example, LU #4), which is mapped to the virtual LU (for example, LU #A), may be the LU that is associated with the FE port (the initiator/target port) (for example, #H03), which is not coupled to a server, rather than the LU that is associated with the FE port (the target port), which is coupled to a server.

<HDKC Coupled to all of the First Coupling Medium, the Second Coupling Medium, and the Third Coupling Medium>

Figure 6:
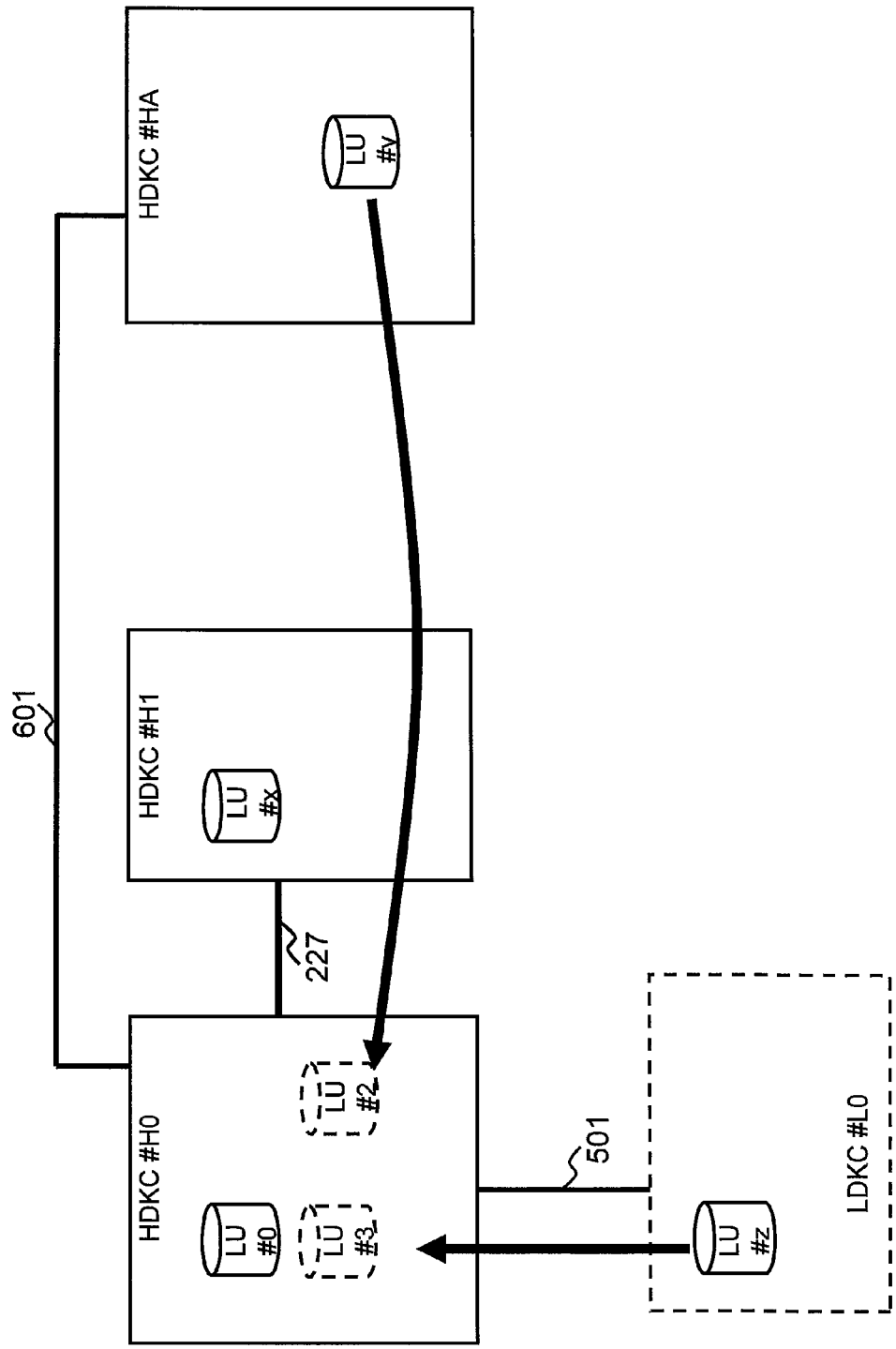
FIG. 6 shows HDKC to which all of a first coupling medium, a second coupling medium, and a third coupling medium are coupled.

FIG. 6 shows the HDKC #H0, which is coupled to all of the first coupling medium, the second coupling medium, and the third coupling medium.

The HDKC #H1 is coupled to the HDKC #H0 via the first coupling medium (the internal bus) 227, the LDKC #L0 is coupled to the HDKC #H0 via the second coupling medium (the external bus) 501, and the HDKC #HA is coupled to the HDKC #H0 via the third coupling medium (the external bus) 601.

The HDKC #H0 comprises the following LUs.

LU #0 based on the RG of the HDKC #H0

LU #x according to the first coupling mode (the HDKC #H0 can directly access the LU #x inside the HDKC #H1)

Virtual LU #3 according to the second coupling mode (the virtual LU to which an external LU #z (the external LU inside the LDKC #L0) is mapped in accordance with the second coupling mode)

Virtual LU #2 according to the third coupling mode (the virtual LU to which an external LU #y (the external LU inside the HDKC #HA) is mapped in accordance with the third coupling mode)

For example, the following can be said with respect to the multiple LUs described above.

At least one of the LUs #0, #x, #2 and #3 may be the LU (for example, the DP-LU) that is recognized from the server and the LU (for example, a pool LU) that is not recognized from the server.

At least one of the LUs #x, #y and #z may be the DP-LU.

At least one of the LUs #x and #y may be the virtual LU according to the second coupling mode (the virtual LU to which the external LU is mapped in accordance with the second coupling mode).

In FIG. 6, at least one of the LUs #0 through #3 that the HDKC #H0 provides to the server may be an ordinary LU or a DP-LU.

The "ordinary LU" may be a LU for which a storage area, which has a capacity equivalent to the capacity of the LU when the LU was created, is allocated from the RG. The ordinary LU may be also be a virtual LU to which an external LU is mapped.

The "DP-LU" is a virtual LU that is partitioned into multiple virtual pages. In a case where the DKC has received a write command specifying an address belonging to an unallocated virtual page (a virtual page to which an actual page has not been allocated), the DKC is able to allocate an unallocated actual page (an actual page that has not been allocated to a virtual page) from the pool to this unallocated virtual page. The pool, for example, may be configured from an ordinary LU (a pool LU) that is based on one or more RG. The pool may exist in plurality. Each pool LU may be partitioned into two or more actual pages. The virtual page is a virtual storage area, and the actual page is a storage area that configures the pool.

Therefore, with the exception of a state in which respective actual pages have been allocated to all virtual pages configuring the DP-LU, the total capacity of the actual page allocated to the DP-LU is smaller than the capacity of the DP-LU (the virtual capacity). The DKC is able to consolidate the management of multiple actual pages in the form of a pool. One actual page may be based on multiple PDEVs that configure one or more RGs. Data written to the actual page may be written to the multiple PDEVs configuring this RG in accordance with the RAID level of the RG constituting the basis of this actual page.

Furthermore, either one or multiple DP-LUs may be associated with a single pool, and an actual page may be allocated to the DP-LU from the pool that is associated with this DP-LU. Also, the actual page to be allocated from the pool may be an actual page based on a RG that differs from the RG constituting the basis of the actual page that was allocated n-times before (where n is a natural number) (for example, n may equal 1). Specifically, for example, the RG that constitutes the basis of the actual page to be allocated may be switched in round-robin style. In accordance with this, it is possible to avoid the convergence of I/Os with respect to a specific RG, thereby promising enhanced I/O performance in the DKC. In a case where either a DP-LU or a group of DP-LUs (DP-LU group) associated with one pool belongs to tiers that differ for each either DP-LU or DP-LU group (for example, a case in which either a first DP-LU or a first DP-LU group belongs to a first tier, and either a second DP-LU or a second DP-LU group belongs to a second tier), an actual page may be allocated by tier from a RG that differs from a RG that is the basis of an actual page that was allocated n-times before (For example, for either the first DP-LU or the first DP-LU group, the RG that is the basis of an actual page to be allocated is shifted using the round robin mode within a range of multiple RGs configuring a first tier, and for either the second DP-LU or the second DP-LU group, the RG that is the basis of an actual page to be allocated is shifted using the round robin mode within a range of multiple RGs configuring a second tier.) Furthermore, when applying the round robin mode, the shifting of the RG that constitutes the basis of the actual page to be allocated is not limited to a single RG unit, but rather may be shifted in either partial RG units or multiple RG units (RG group units). In a case where shifting is in multiple RG units, it is possible to avoid I/Os being concentrated on specific multiple RG units (RG group units) in accordance with the processor 222 of the HDKC unit 141, the HDKC or the LDKC 151 allocating either one or multiple actual pages from other multiple RG units (RG group units) subsequent to having allocated either one or multiple actual pages from certain multiple RG units (RG group units), thereby making it possible to enhance the I/O performance of the DKC.

Furthermore, each virtual page of one or multiple DP-LUs is able to be mapped in accordance with the access characteristic of each virtual page to an actual page that corresponds to a storage medium that is suitable for this access characteristic. Or, it is also possible to change the mapping in accordance with the access characteristic of each virtual page from an actual page that corresponds to a storage medium that is unsuitable for this access characteristic to an actual page that corresponds to a storage medium that is suitable for this access characteristic. As used here, the access characteristic, for example, is the type of access of each virtual page (either a random access or a sequential access, or a type such as the access source server 101 or application 111 described hereinabove), either the I/O frequency or the write frequency of each virtual page, or the frequency at which data written to each virtual page is written from the cache memory 224 to a storage medium corresponding to an actual page mapped to the virtual page, or the frequency at which the data, which is to be written or read to each virtual page, is either written or read between the cache memory 224 and the storage medium corresponding to the actual page that is mapped to the virtual page. In accordance with this, the multiple tiers of this embodiment (for example, either the tier level or the tier level range) are managed for each virtual page of either one or multiple DP-LUs, and can be seen as tier technology for each virtual page of either one or multiple DP-LUs rather than the LU tier technology as described hereinabove. However, in a case where each virtual page is mapped in accordance with the access characteristic of each virtual page to an actual page corresponding to a storage medium that is suitable for this access characteristic, the tier technology is for each virtual page, but in a case where the actual page mapped to a virtual page in accordance with the access characteristic of each virtual page changes, since the relationship between the LU and the tier has been set beforehand, the LU tier technology is applied when creating a DP-LU, and thereafter the tier technology for each virtual page is applied in accordance with changing the actual page that is mapped to the virtual page in accordance with the access characteristic.

Furthermore, in this embodiment, an actual page is allocated, according to a write command from the server, to the virtual page to which the address specified in this write command belongs, but the present invention is not limited to an example in which actual pages are not allocated to all the areas of DP-LU when, for example, the DP-LU is created. For example, the examples given below may also apply to the present invention. The capacity that is actually used in any of the examples cited below can be reduced.

FIRST EXAMPLE

A storage area (for example, an actual page) may be allocated beforehand (prior to a write command with respect to the DP-LU being received from the server) to at least one virtual page (or a portion of the area comprising the virtual page) of multiple virtual pages configuring the DP-LU. That is, pre-allocation may be performed. In a case where the already allocated storage area is insufficient and additional storage area is needed to store data according to a write command, the DKC (internal controller) may additionally allocate a storage area to the DP-LU from the pool.

SECOND EXAMPLE

Either an actual page or a control area in which is stored zero data (for example, data that is configured from the bit value "0") may be tentatively allocated beforehand (prior to a write command being received from the server with respect to a DP-LU) to at least one virtual page of the multiple virtual pages that configure this DP-LU. That is, a tentative allocation may be performed. The zero area (the actual page or control area in which the zero data is stored), for example, may be an area on a storage device such as a SSD. The DKC (internal controller), upon receiving a write command, may change the storage area to be allocated to the write-destination virtual page from the zero area to the actual page in which the data is to be stored. That is, an actual allocation may be performed. The DKC (internal controller), upon having received from the server a read command specifying an address belonging to a virtual page for which this actual allocation has not been completed, may respond to the server with the zero data inside the zero area allocated to this virtual page.

In the United States, the specification and drawings of U.S. Pat. No. 7,555,601 (Yamagami) are cited in relation to I/O with respect to the DP-LU. In accordance with this, the Storage Control System corresponds to the HDKC unit 141 and LDKC 151 of the present application, and is applied to the I/O processing by the HDKC unit 141 with respect to the DP-LU, and to the I/O processing by the LDKC unit 151 with respect to the DP-LU. Furthermore, this citation is not limited solely to the first coupling mode, but rather can also be cited in relation to the second and third coupling modes and I/Os with respect to the DP-LU.

<Example of Reserving Unused Capacity in Shared Pool Related to this Embodiment>

Figure 7:
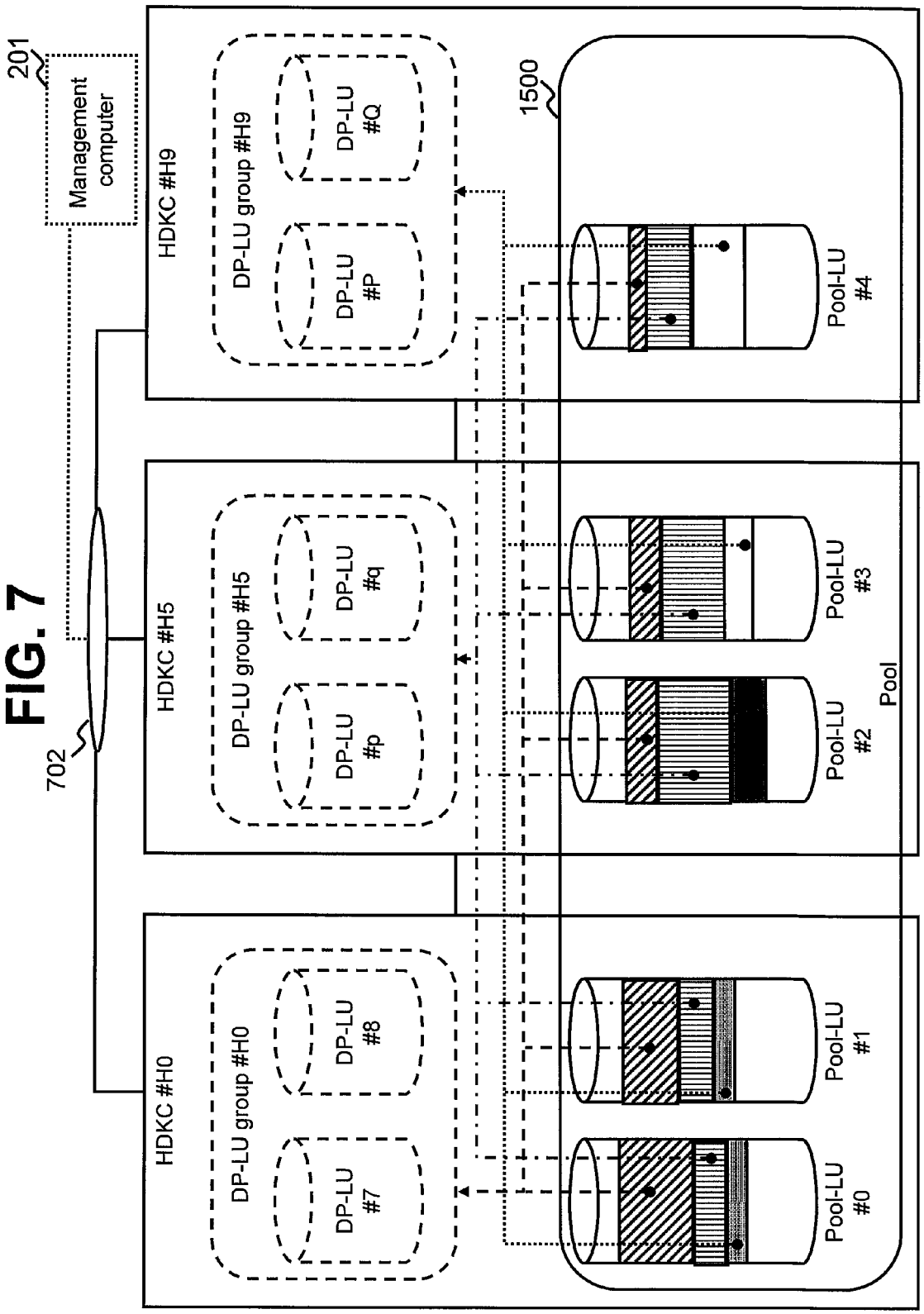
FIG. 7 shows an embodiment of reserving unused capacity in a shared pool related to an embodiment of the present invention.

FIG. 7 shows an example of reserving an unused capacity in a shared pool related to this embodiment. Furthermore, in the explanation that refers to FIG. 7, HDKCs #H0, #H5 and #H9 are given as examples of the two or more HDKC.

HDKC #H0 is coupled to HDKC #H5 via a third coupling medium, and, in addition, HDKC #H9 is coupled to HDKC #H5 via a third coupling medium.

HDKCs #H0, #H5 and #H9 each comprise one or more DP-LUs. A set of one or more DP-LUs in a single HDKC may be called a "DP-LU group".

The "DP-LU" is a virtual LU, which has been partitioned into multiple virtual pages. In a case where the DKC has received a write command specifying an address belonging to an unallocated virtual page (a virtual page to which an actual page has not been allocated), the DKC can allocate an unallocated actual page (an actual page, which has not been allocated to a virtual page) from a pool 1500 to this unallocated virtual page.

The multiple HDKCs #H0, #H5 and #H9 share the pool 1500. The pool 1500 is configured from two or more internal volumes of the HDKCs #H0, #H5 and #H9, which share this pool 1500. An internal volume, for example, may be either a RG (RAID Group) or a pool LU, but in this embodiment, the internal volume is a pool LU. Specifically, the pool 1500 is configured using pool LUs #0 and #1 of the HDKC #H0, pool LUs #2 and #3 of the HDKC #H5, and pool LUs #4 and #5 of the HDKC #H9. The pool LU #0 may be an LU based on a PDEV of the HDKC #H0, may be a virtual LU realized by mapping a LU, which is based on a PDEV inside a LDKC coupled to the HDKC #H0 in accordance with the second coupling mode, or may be a virtual LU realized by mapping a LU inside another HDKC coupled to the HDKC #H0 in accordance with the third coupling mode (a virtual LU realized by mapping either an LU, which is based on a PDEV inside the other HDKC, or a LU inside a LDKC, which is coupled to the other HDKC in accordance with the second coupling mode). The pool LU is partitioned into two or more actual pages.

In this embodiment, the multiple HDKCs that share the pool 1500 are only the HDKCs coupled via the third coupling medium, but these multiple HDKCs may also comprise two or more HDKCs coupled via the first coupling medium, and an HDKC that is coupled to a LDKC via the second coupling medium.

The HDKCs #H0, #H5 and #H9, which share the pool 1500, share pool LUs #0 through #4 (for reasons that will be described further below, the LU #5 is excluded from the pool 1500). The HDKC #H0 includes as external LUs the pool LUs #2 through #4 inside the HDKCs #H5 and #H9 coupled via either one or multiple third coupling media. Specifically, the HDKC #H0 can include pool LUs #0 through #4, but of these pool LUs #2 through #4 are external LUs to which pool LUs #2 through #4 inside the HDKCs #H5 and #H9 are mapped.

In a configuration like this, performance-wise it is advantageous to allocate actual pages from as many pool LUs as possible to the DP-LUs in the respective HDKCs #H0, #H5 and #H9. This is because doing so will prevent accesses from concentrating on a single pool LU.

However, when there is a large tier difference between shared pool LUs, the performance of each HDKC will be dragged down to the performance of the pool LU in the lowest tier level. In particular, the distance between HDKCs (the length of the one or multiple third coupling media connecting the HDKCs) is believed to have the greatest impact on HDKC performance.

Consequently, in this embodiment, the unused capacity of each pool LU is given beforehand to at least one (preferably all) of the HDKCs #H0, #H5 and #H9 that share the pool 1500 based on the unused capacity of each pool LU and the pool LU request ratio for each HDKC. The pool LU request ratio is a value determined on the basis of the performance value of the relevant pool LU. One or more actual pages of a capacity that is equal to or less than the unused capacity given beforehand is/are allocated to one or more DP-LUs in a DP-LU group of the HDKC, which is the provision destination of this unused capacity. Hereinbelow, the giving of unused capacity (an unused actual page) beforehand may be called a "reservation", and the association with a DP-LU of an unallocated actual page from multiple reserved actual pages may be called an "allocation". Furthermore, in this embodiment, the "unused capacity" is the total of a surplus capacity (capacity that has not been reserved) and an unallocated capacity (capacity, which has been reserved but has not been allocated to any DP-LU), but the unused capacity may also be either one of the surplus capacity or the unallocated capacity.

The difference (hereinafter, the performance difference) between a pool LU maximum performance value (for example, a tier level) and a pool LU minimum performance value (for example a tier level) is computed for each of the HDKCs #H0, #H5 and #H9. In a case where the performance difference exceeds a prescribed value in at least one of the HDKCs #H0, #H5 and #H9, the minimum performance value LU (LU #5 in FIG. 7) is not used as a pool LU for which unused capacity is reserved. This is because using this LU #5 as a pool LU in the shared pool will result in the performance of at least one of the HDKCs #H0, #H5 and #H9 being lowered due to the performance of the LU #5. Furthermore, in addition to the minimum performance value LU for which the performance difference exceeds a prescribed value as described hereinabove, an LU having a performance value that is less than a prescribed value for at least one of the HDKCs #H0, #H5 and 190 H9 may also be regarded as not being a member of the pool 1500.

In this embodiment, one of the HDKCs #H0, #H5 and #H9, which share the pool 1500 (hereinafter, the master HDKC #H0), can execute processing for:

(a) determining the unused capacity to be given to the HDKCs #H0, #H5 and #H9 for each of the HDKCs #H0, #H5 and #H9 based on the pool LU unused capacity and the request ratios of the respective pool LUs #0 through #4 for each of the HDKCs #H0, #H5 and #H9 with respect to each of the pool LUs #0 through #4; and (b) carrying out for each of the HDKCs #H0, #H5 and #H9 the provision to each HDKC of the unused capacity of each pool LU determined with respect to the HDKC.

As a result of this, as shown in FIG. 7, the optimum unused capacity (either all or a portion of the unused capacity of the pool LU) based on both the unused capacities of the pool LUs #0 through #4 and the performance values of the pool LUs #0 through #4 is reserved in the HDKCs #H0, #H5 and #H9 from the pool LUs #0 through #4.

Furthermore, the processing of the above-mentioned (a) and (b) may be carried out by a management computer 701 either in addition to or in place of any of the multiple HDKCs sharing the pool 1500. The management computer 701, for example, is communicatively coupled via a communication network 702 to at least one of the multiple HDKCs sharing the pool 1500. The management computer 701, for example, comprises a communication interface device for communicating with the HDKC, a storage resource, and a processor coupled thereto. The processor can carry out the above-mentioned (a) and (b) on the basis of information stored in the storage resource.

Furthermore, various units, such as GB (gigabyte), can be used as the unit for the unused capacity and the allocated capacity, but in this embodiment, a number of pages may be used as the unit for the unused capacity and the allocated capacity.

This embodiment will be explained in more detail hereinbelow.

<Management Information>

Figure 8:
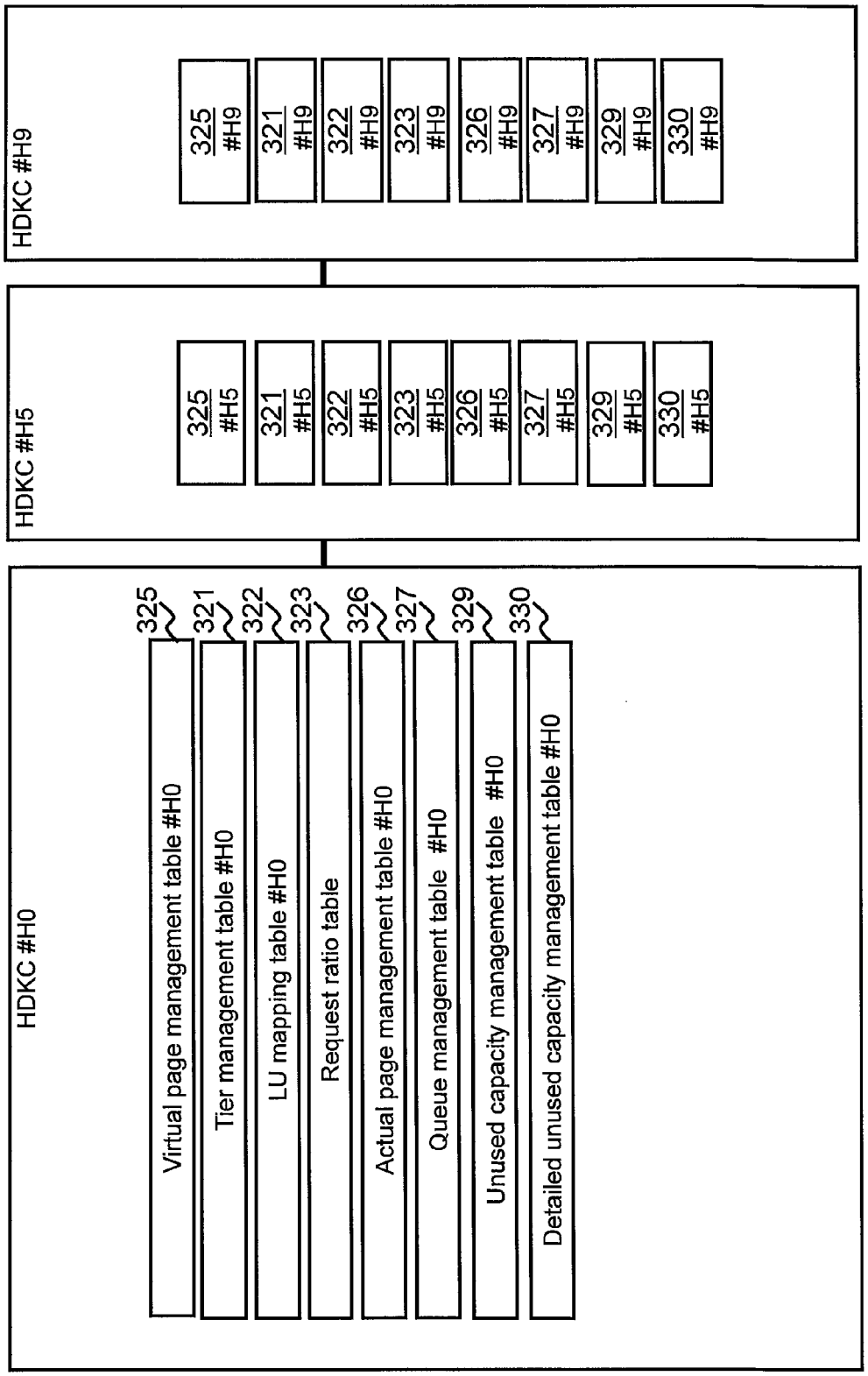
FIG. 8 shows an example of management information of the storage system 110.

FIG. 8 shows an example of management information of the storage system 110.

The management information is information that the storage system 110 manages. All of the HDKCs may store all the types of management information. The contents of the management information may be the same for all the HDKCs or it may differ for each HDKC. For example, a first type of management information stored by a first HDKC may comprise only information related to the first HDKC, and it need not comprise information that is not related to the first HDKC.

There may be management information that a storage area capable of being shared by multiple HDKCs may store, and there may be management information that individual HDKCs may store to prevent a drop in access performance.

According to FIG. 8, an individual HDKC, for example, can store the following management information:

a virtual page management table 325 comprising information related to a virtual page;

a tier management table 321 comprising information related to a tier;

a LU mapping table 322 comprising information denoting the corresponding relationship of the LUs;

a request ratio table 323 denoting the request ratio for each pool LU, which is the source for reserving the unused capacity;

an actual page management table 326 comprising information related to an actual page configuring a pool;

a queue management table 327 comprising a first entry pointer of a queue for managing an unallocated actual page;

an unused capacity management table 329 comprising information related to an unused page; and a detailed unused capacity management table 330 comprising detailed information related to the unused page.

A CPU inside the HDKC can access a table stored in this HDKC. Furthermore, the CPU inside the HDKC may also be able to access a table inside a HDKC coupled to this HDKC via the first coupling medium, but may not be able to access a table inside a HDKC coupled to this HDKC via the third coupling medium.

Although not shown in the drawing, each HDKC may also store a LU management table, which comprises information related to the LU of this HDKC (for example, a LU ID, a LU type, and a storage capacity for each LU). As LU types, for example, there may be an ordinary LU (a LU based on the RG inside the HDKC), a virtual LU, and a DP-LU (a LU according to Dynamic Provisioning (Thin Provisioning)). The LU ID, for example, may be a LUN (Logical Unit Number), which is the identification information that a server uses, identification information that the server does not use (a volume ID), or a combination of these.

All of the tables described above may be stored in the same storage resource (for example, a CM (SM area)), or may be distributed among multiple storage resources (for example, a LM and a CM (SM area)) in each HDKC. Furthermore, a portion of the above-described tables may be stored in a storage resource inside a certain HDKC and another portion of the above-described tables may be stored in the storage resource inside another HDKC in the HDKC unit.

The above-described tables will be explained in detail below by referring to the drawings.

<Virtual Page Management Table 325>

FIG. 9 shows an example of the configuration of the virtual page management table 325 (for example, #H0).

The virtual page management table #H0, for example, comprises the following information for each virtual page of the HDKC #H:

a DP-LU ID 1301, which is an identifier of a DP-LU comprising a virtual page;

a virtual page address 1302 denoting the address of the virtual page;

an allocation status 1303 denoting whether or not an actual page has been allocated to the virtual page;

a pool RG ID 1304, which is the identifier of a RG (pool RG) constituting the basis of the actual page allocated to the virtual page; and an actual page address 1305 denoting the address of the actual page allocated to the virtual page.

<Tier Management Table 321>

FIG. 10A shows the configuration of a tier management table 321 (for example, #H0). FIG. 14 shows the configuration of a tier management table #H0.

The tier management table #H0, for example, comprises the information listed below for each LU of the HDKC #H0:

a RG ID 901, which is the identifier of the RG constituting the basis of a LU;

a LU ID 902, which is the identifier of the LU;

a coupling mode 903, which is a point score corresponding to coupling mode to which the LU conforms;

a PDEV type 904, which is the point score corresponding to the type of PDEV on which the LU is based; and a tier level 905, which is a value (for example, the total of the coupling mode 903 and the PDEV type 904) computed based on the coupling mode 903 and the PDEV type 904.

In a case where the LU is a DP-LU, at least one of the RG ID 901 and the PDEV type 904, for example, may be a value signifying this fact.

In this embodiment, a "tier" is a LU tier. In this embodiment, a value called a "tier level" is computed for a LU. A tier corresponding to the computer tier level from among multiple tiers is the tier to which the LU belongs. The tier level, for example, can also be called a value for denoting the size of the LU I/O performance (for example, the size of the data capable of being input/output per unit of time, or a response time). A single tier may exist with respect to a single tier level, or a single tier may exist with respect to a single range of tier levels, or a combination thereof. In this embodiment, the smaller the tier level the higher the level of the tier. However, the relationship between the size of a tier level and the height of a tier is not limited thereto. For example, a smaller tier level may represent a lower tier level.

The LU tier level is a function of one or more factors (hereinafter, the performance factor) that affect the I/O performance of this LU. Specifically, for example, in this embodiment, the tier level is a value (for example, a total) computed using one or more point scores corresponding to one or more performance factors. The one or more performance factors of the LU, according to the example of FIG. 10A, are the coupling mode (that is, the coupling mode via which an LU inside a DKC is coupled to the HDKC #H0 for mapping purposes) and the PDEV type (the type of the PDEV on which the LU is based).

Examples of the corresponding relationships between the performance factors and the point scores thereof given as examples in FIG. 10A are shown in FIG. 10B.

According to FIG. 10B, the more advantageous the performance factor is for I/O performance, the smaller the point score. For this reason, the tier level will differ in a case where the PDEV type is the same but the coupling mode differs, and a case where the coupling mode is the same but the PDEV type differs.

According to FIG. 10B, of the first through the third coupling modes, I/O performance is advantageous in the order of the first coupling mode, the third coupling mode and the second coupling mode. However, for example, in a case where the performance and/or functionality of a DKC coupled to the HDKC in accordance with the second coupling mode is/are the same as the HDKC, the point score of the second coupling mode may be the same as the point score of the third coupling mode.

Furthermore, according to FIG. 10B, the PDEV type 904 is a value corresponding to the I/O performance of the PDEV. For example, the point score for the SSD is smaller than the point score for the SAS-HDD, and the point score for the SAS-HDD is smaller than the point score for the SATA-HDD.

Furthermore, in addition to the type of the PDEV, which configures the RG constituting the basis for the LU corresponding thereto, the PDEV type 904 may also be determined based on the RAID level (may also include a combination such as 3D+1P) of this RG. In this case, for example, since RAID5 is a higher performance level than RAID3, the point score for RAID5 will be smaller than the point score for RAID3. Furthermore, in addition to the type of the medium, which configure the RG constituting the basis for the LU corresponding to the PDEV type 904, the PDEV type 904 may also be determined based on the RAID level (may also include a combination such as 3D+1P) of this RG.

Furthermore, either in addition to or in place of at least one of the coupling mode or the PDEV type, one or more other performance factors, for example, at least one of the following performance factors can be used as the tier level-affecting performance factor:

the length and/or type of the coupling medium coupling the DKCs; and the performance of the controller inside the DKC.

<LU Mapping Table 322>

FIG. 11 shows an example of the configuration of a LU mapping table 322 (for example, #H0).

The LU mapping table 322, for example, comprises the following information for each virtual LU:

a LU ID 1501, which is the identifier of a virtual LU;
a DKC ID 1502, which is the identifier of the DKC that comprises an external LU mapped to a virtual LU;
an external LU ID 1503, which is the identifier of the external LU mapped to the virtual LU; and
a LU type 1504, which denotes the type of the external LU mapped to the virtual LU.

The values of the LU type 1504 may include "DP-LU", which signifies a DP-LU, and "Non-DP-LU", which signifies that the LU is not a DP-LU. According to FIG. 11, an external LU #Y inside the HDKC #H0 is mapped to a LU #A, but because the external LU #Y is an ordinary LU, the LU type 1504 corresponding to the LU #A is "Non-DP-LU".

<Actual Page Management Table 326>

FIG. 12A shows an example of the configuration of the actual page management table 326 (for example, #H0).

The actual page management table #H0, for example, comprises the following information for each actual page of the HDKC #H0:

A table pointer 2001, which denotes the address to the row that comprises information related to an actual page;
a pool LU ID 2002, which is the identifier of the pool LU that includes the actual page;
an actual page address 2003, which denotes the address of the actual page;
an allocation status 2004, which denotes the allocation status of the actual page;
a DP-LU 2005, which is the identifier of the DP-LU comprising the allocation-destination virtual page of the actual page; and
an unallocated queue pointer 2006, which denotes the table pointer 1401 of a row related to another unallocated actual page.

The unallocated actual page is managed by a queue (hereinafter, the unallocated queue). The unallocated queue pointer 1406 denotes the table pointer 1401 of the row that corresponds to the unallocated actual page subsequent to the actual page corresponding to this pointer 1406. The CPU #H0 finds the actual page (the actual page corresponding to the table pointer 2001 that coincides with the pointer of the queue management table 327 (#H0) shown in FIG. 12B) at the top of the unallocated queue as the actual page to be allocated to the virtual page. Furthermore, according to FIG. 12B, the queue management table 327 (#H0) comprises a table pointer in the row corresponding to the first actual page of the unallocated queue.

<Request Ratio Table 323>

FIG. 13A shows an example of the configuration of the request ratio table 323 (#H0). FIG. 13B shows an example of the configuration of the request ratio table 323 (#H5). FIG. 13C shows an example of the configuration of the request ratio table 323 (#H9).

The request ratio table 323 of the HDKCs #Hp (where p is 0, 5 or 9), for example, comprises the following information for each pool LU #q (where q is any of the integers 0 through 4), which comprises a source for reserving unused capacity:

a LU ID 1801, which is the identifier of the pool LU #q;
a tier level 1802, which is the value $T_{qp}$ of the tier to which the pool LUs #q in the HDKC #H0 belong;
a performance value 1803, which is the value of the performance value $P_{qp}$ (for example, the I/O performance) for the HDKC #H0 of the pool LUs #q; and
an original request ratio 1804, which is the request ratio $r_{qp}$ (hereinafter, the original request ratio) for the HDKC #H0 of the pool LUs #q.

Information of the pool LUs #0 through #4, which configure the same pool 1500, is registered in each of the request ratio tables #H0, #H5 and #H9 of the HDKCs #H0, #H5 and #H9 sharing this pool 1500.

The pool LU performance value $P_{qp}$ and the original request ratio $r_{qp}$ will be explained below.

The pool LU #q performance value $P_{qp}$ for the HDKC #Hp is determined for the HDKC #Hp based on the tier level $T_{qp}$ of this pool LU #q. Specifically, for example, the performance value $P_{qp}$ is the inverse number of the tier level $T_{qp}$.

The pool LU #q original request ratio $r_{qp}$ for the HDKC #Hp is determined based on the performance value $P_{qp}$. Specifically, for example, the original request ratio $r_{qp}$ is the value obtained by dividing the performance value $P_{qp}$ by the total of the four performance values $P_{0p}$ through $P_{4p}$ corresponding to the pool LUs #0 through #4.

As is clear from the above explanation and FIGS. 13A through 13C, the performance value $P_{qp}$ may differ according to the HDKC. For example, the performance value $P_{0p}$ of the pool LU #0 is likely to be a value denoting low performance in the HDKCs #H5 and/or #H9, which do not comprise this pool LU #0, even though the performance value $P_{qp}$ is one that denotes a high value in the HDKC #H0, which comprises this pool LU #0.

<Unused Capacity Management Table 329>

FIG. 14A shows an example of the configuration of the unused capacity management table 329 (for example, #H0).

The unused capacity management table #H0, for example, comprises the following information:
- a number of unallocated pages 1401 denoting the number of unallocated actual pages, which have not been allocated to any DP-LU, of the total unused capacity reserved with respect to each pool LU in the HDKC #H0;
- a previous number of unallocated pages 1402, which is the number of unallocated pages when the immediately previous unused capacity reservation process was carried out; and
- a page usage 1403, which is the number of allocated actual pages.

In this embodiment, the unused capacity reservation process includes an initial reservation process, which is carried out the first time, and an additional reservation process, which is carried out the second and subsequent times for each pool shared by the multiple HDKCs, but the additional reservation process does not necessarily have to be carried out.

It is preferable that the initial reservation process be carried out at the time the pool 1500 is created, but may also be carried out after one or more actual pages have been allocated from the pool 1500 to the DP-LU.

The rebalancing of the unused capacity may be carried out using the additional reservation process. The "rebalancing of the unused capacity" is a process in which the unallocated capacity of the reserved capacity of each pool LU is recovered from each HDKC, and the recovered unallocated capacity is redistributed (re-reserved) to multiple HDKCs. The additional reservation process may be carried out at a prescribed time. The prescribed time, for example, may be at least one of the following:
- a regularly occurring time;
- the time at which the master HDKC #H0 detects that the unallocated capacity with respect to a certain pool LU in any of the HDKCs #H0, #H5 or #H9 has been exhausted ("Exhausted" may signify that a prescribed percentage or more of the reserved unallocated capacity has been allocated.); and
- the time when the capacity of the pool 1500 undergoes a change (for example, the time at which the shared pool LUs either increases or decreases).

<Detailed Unused Capacity Management Table 330>

FIG. 14B shows an example of the configuration of the detailed unused capacity management table 330 (for example, #H0).

The detailed unused capacity management table #H0, for example, comprises the following information for each pool LU:
- a LU ID 1411, which is the identifier of a pool LU;
- a pool reserved capacity 1412 denoting an unused capacity reserved for the HDKC #H0;
- an unallocated page capacity 1413 denoting a capacity (for example, the number of actual pages) exclusive of the capacity allocated from the unused capacity reserved for the HDKC #H0;
- a previous unallocated page capacity 1414, which is the number of unallocated pages at the time the immediately previous unused capacity reservation process was carried out;
- a page usage 1415, which is the number of allocated actual pages; and
- a percentage of LU in use 1416, which is the ratio of allocated capacity with respect to the pool reserved capacity 1412 (the unused capacity reserved for the HDKC #H0).

<Overview of Unused Capacity Reservation Process>

An overview of the unused capacity reservation process will be explained hereinbelow. Furthermore, the various processes are realized in accordance with the CPU executing a computer program, but a portion of these processes may be executed using a hardware circuit.

First, an overview of the unused capacity reservation process will be explained. As mentioned hereinabove, the unused capacity reservation process includes the initial reservation process and the additional reservation process, but the additional reservation process is used as an example in the following explanation.

(Step 1)

As shown in FIG. 15A, the master HDKC #H0 identifies the utilization ratio for each of the HDKCs #H0, #H5 and #H9. Specifically, for example, the master HDKC #H0:

(15-1) Refers to the information of the unused capacity management tables #H0, #H5 and #H9, and computes the usage (the number of actual pages allocated from the immediately previous time to this time) this time obtained by subtracting the number of unallocated pages 1401 from the previous number of unallocated pages 1402 with respect to each of the HDKCs #H0, #H5 and #H9; and (15-2) computes a utilization ratio, which expresses the usage this time as a prescribed percentage, with respect to each of the HDKCs #H0, #H5 and #H9 based on the three usages this time corresponding to the HDKCs #H0, #H5 and #H9. Furthermore, the utilization ratios of the HDKCs #H0, #H5 and #H9 may all be the same (for example, 1:1:1) in the initial reservation process. This is because in a case where an actual page has not been allocated to any of the DP-LU from the pool 1500 the usage of each of the HDKCs #H0, #H5 and #H9 will be 0.

(Step 2)

As shown in FIG. 15B, the master HDKC #H0 identifies the unused capacity $V_q$ of each pool LU #q (here, q is any integer from 0 to 4). The master HDKC #H0 can compute the unused capacity $V_q$ of the pool LU by subtracting the usage of this pool LU (total number of allocated actual pages) from this pool LU's capacity. The pool LU capacity, for example, can be identified from information of the HDKC that comprises this pool LU. The pool LU usage is the total of the unallocated page usage 1415 for this pool LU in the information of the detailed unused capacity management table #H0, #H5 and #H9.

That is, the unused capacity $V_q$ of the pool LU is the total of the surplus capacity and the unallocated capacity. The "surplus capacity" is the capacity, which has not been reserved for any HDKC from among the pool LU capacity. The "unallocated capacity" is the total capacity (number) of one or more actual pages, which have not been allocated from among the reserved capacity of the pool LU.

(Step 3)

As shown in FIG. 16A, the master HDKC #H0 computes three original request ratios $r_{q0}$, $r_{q5}$, and $r_{q9}$ respectively corresponding to the HDKCs #H0, #H5, and #H9 with respect to each pool LU #q, and computes a value (for example, the total of these three original request ratios $r_{q0}$, $r_{q5}$, and $r_{q9}$) based on these three original request ratios $r_{q0}$, $r_{q5}$, and $r_{q9}$. Each original request ratio $r_{qp}$, for example, is a request ratio computed for HDKC #Hp in accordance with the computational formulas shown in FIGS. 13A through 13C. A value (for example, the total of five original request ratios $r_{0p}$ through $r_{4p}$), which is based on five original request ratios $r_{0p}$ through $r_{4p}$ respectively corresponding to all the pool LUs #0 through #4 being shared, becomes a prescribed value (for example, 1) for HDKC #Hp.

(Step 4)

As shown in FIG. 16B, the master HDKC #H0 computes three processed request ratios $R_{q0}$, $R_{q5}$, and $R_{q9}$ respectively corresponding to the HDKCs #H0, #H5, and #H9 with respect to each pool LU #q, and computes a value (for example, the total of these three processed request ratios $R_{q0}$, $R_{q5}$, and $R_{q9}$) $K_q$ based on these three processed request ratios $R_{q0}$, $R_{q5}$, and $R_{q9}$. The processed request ratio $R_{qp}$ is the post-processing value of the original request ratio $r_{qp}$, for example, a value, which is based on the original request ratio $r_{qp}$ and the utilization ratio (the utilization ratio shown in FIG. 15A) of the HDKC #Hp. Specifically, for example, the processed request ratio $R_{qp}$ is the sum of the original request ratio $r_{qp}$ and the utilization ratio (the utilization ratio shown in FIG. 15A) of the HDKC #Hp. Furthermore, the processed request ratio $R_{qp}$ may be a value based on a numeric value according to another type of element, such as the importance of the HDKC #Hp, either in addition to or in place of the utilization ratio of the HDKC #Hp.

(Step 5)

As shown in FIG. 17A, the master HDKC #H0 computes a value $B_q$ based on the unused capacity $V_q$ and the processed request ratio $R_{qp}$ with respect to each pool LU #q, and based on five $B_q$ corresponding to each of the five pool LUs #0 through #4, identifies the most popular pool LU (hereinafter, the best pool LU), specifically, the pool LU, which will be exhausted first in a case where the unused capacity $V_q$ of each pool LU #q is used in accordance with the three processed request ratios $R_{q0}$, $R_{q5}$, and $R_{q9}$. Specifically, for example, the value $B_q$ is obtained by dividing the $V_q$ by the $R_{qp}$. The master HDKC #H0 identifies the smallest value X of the five $B_q$'s. The pool LU corresponding to the smallest value X is the best pool LU. In the following explanation, it is supposed that the best pool LU is pool LU #3 as shown in the example of FIG. 17A.

(Step 6)

As shown in FIG. 17B, the master HDKC #H0 carries out the following operations:

The master HDKC #H0 computes the reserved capacity $G_{qp}$ (the unused capacity reserved for each HDKC #Hp) for each HDKC #Hp with respect to each pool LU #q in Case C (a hypothetical case in which the unused capacity $V_3$ of the best pool LU #3 has been used in accordance with the processed request ratios $R_{30}$, $R_{35}$, $R_{39}$). The reserved capacity $G_{qp}$ is computed based on the processed request ratio $R_{qp}$ and the smallest value X. Specifically, for example, the reserved capacity $G_{qp}$ is the sum of the processed request ratio $R_{qp}$ and the smallest value X.

The master HDKC #H0 computes the total $Z_q$ of the reserved capacity $G_{qp}$ with respect to each pool LU #q, and, in addition, computes the remaining capacity $U_q$, which is a value obtained by subtracting the $Z_q$ from the unused capacity $V_q$. In a case where the remaining capacity $U_q$ is less than 0, the unused capacity of the pool LUs #q is insufficient in Case C. For this reason, (Step 3) through (Step 6) are executed with respect to pool LUs #0 through #2 and #4, exclusive of pool LU #3. The original request ratio in (Step 3) for the pool LUs #q (where q is 0, 1, 2, or 4 at this stage) at this time differs from the original request ratio when pool LU #3 is included. This is because the performance value total required for the computation of the original request ratio will be different when pool LU #3 is not included. Furthermore, the unused capacity $V_p$ is the remaining capacity $U_p$ in these (Step 3) through (Step 6).

The master HDKC #H0 computes the total $Y_p$ of the reserved capacity $G_{qp}$ with respect to each HDKC #Hp. The $Y_p$ is the temporary reserved capacity for the HDKCs #Hp.

(Step 7)

The master HDKC #H0 determines whether or not the total $Y_p$ is equal to or larger than the reserved capacity requested with respect to the HDKC #Hp. In a case where the total $Y_p$ is less than the reserved capacity requested with respect to the HDKC #Hp, the master HDKC #H0 executes (Step 3) through (Step 6) with respect to two or more pool LUs #q corresponding to all of the remaining capacities $U_p$ other than 0. The unused capacity $V_g$ is the remaining capacity $U_q$ in these (Step 3) through (Step 6).

In accordance with the (Step 1) through (Step 7) hereinabove, the reserved capacities $G_{0p}$ through $G_{4p}$ from the pool LUs #0 through #4 are reserved for each HDKC #Hp. In accordance with this, the pool reserved capacity 1412 and the unallocated page capacity 1413 are updated in the detailed unused capacity management table #Hp.

The HDKC #Hp (internal controller #Hp) receives a write command specifying a DP-LU of this HDKC #Hp. In a case where an actual page has not been allocated to the write-destination virtual page specified in this write command, an unallocated actual page is allocated from any pool LU #q to this write-destination virtual page. The HDKC #Hp controls the total number of actual pages allocated to the DP-LU group of this HDKC #Hp to equal to or less than the reserved capacity $G_{qp}$ (for example, the percentage of LU in use 1416 is equal to or less than a prescribed threshold) with respect to each pool LU #q. Specifically, for example, the internal controller #Hp of the HDKC #Hp performs the processing (a1) through (a3) below upon receiving a write command having a virtual page to which an actual page has not been allocated as the write destination:

(a1) determines whether or not the page usage 1415 corresponding to the pool LU #q will exceed the reserved capacity $G_{qp}$ when an actual page is allocated from the pool LU #q to the write-destination virtual page (for example, whether the percentage of LU in use 1416 will exceed the prescribed threshold);

(a2) does not allocate an actual page from the pool LU #q to the write-destination virtual page in a case where the result of the determination in the above-mentioned (a1) is affirmative; and (a3) allocates an actual page from the pool LU #q to the write-destination virtual page in a case where the result of the determination in the above-mentioned (a1) is negative, and, in addition, decreases the unallocated page capacity 1413 in proportion to the allocated actual page and increases the page usage 1415 in proportion to the allocated actual page with respect to this pool LU #q, and updates the percentage of LU in use 1416 based on this post-update page usage 1415 and the unallocated page capacity 1413.

In the above-mentioned (a2), the HDKC #Hp (1) may output a message to the management computer 201 denoting that the capacity of the pool LU #q will be added, (2) may make the determination of the above-mentioned (a1) with respect to another pool LU #q, and (3) in a case where the result of the determination of the above-mentioned (a1) is negative for all the pool LUs #q, may carry out a prescribed error process (for example, output a message to the management computer 201 denoting that the capacity of the pool 1500 will be added).

The HDKC #Hp may select from among the pool LUs #0 through #4 a pool LU to be the actual page allocation source at the same ratio as the four request ratios (either the original request ratios $r_{0p}$ through $r_{4p}$ or the processed request ratios $R_{0p}$ through $R_{4p}$) respectively corresponding to the pool LUs #0 through #4. That is, the HDKC #Hp may select the pool LU to be the allocation source such that the four page usages 1415 respectively corresponding to the pool LUs #0 through #4 become the same ratios as the four request ratios (either the original request ratios $r_{0p}$ through $r_{4p}$ or the processed request ratios $R_{0p}$ through $R_{4p}$) respectively corresponding to the pool LUs #0 through #4. Furthermore, the HDKC #Hp may allocate an actual page as usual from the pool LU #q in accordance with a range within which the page usage 1415 corresponding to this pool LU #q does not exceed the reserved capacity $G_{qp}$, and may allocate an actual page from another pool LU in a case where the page usage 1415 corresponding to the pool LU #q will exceed the reserved capacity $G_{qp}$ when an actual page is allocated from this pool LU #q (for example, the percentage of LU in use 1416 will exceed the prescribed threshold). Furthermore, the HDKC #Hp may select the allocation-source pool LUs of the actual page evenly (for example, in so-called round robin fashion).

Furthermore, in a case where the actual page allocation-source pool LU is an external LU and write-targeted data is to be written to the allocated actual page, the HDKC #Hp specifies the address belonging to the allocated actual page and sends a write command having this data as the write target to another HDKC, which comprises a pool LU #q mapped to the allocation-source pool LU (the external LU). In accordance with this, the write-targeted data is written to the actual page of the actual pool LU #q corresponding to the actual page in the external LU.

Furthermore, the HDKC #Hp, in a case where data is to be read from an actual page in the external LU (pool LU), sends a read command, which specifies the address belonging to this actual page, to another HDKC comprising the pool LU #q mapped to the external LU (the pool LU). In accordance with this, the read-targeted data is read from the actual page of the actual pool LU #q corresponding to the actual page in the external LU and transferred from the other HDKC to the HDKC #Hp, and the HDKC #Hp can send the read-targeted data to the source of the read command (a server).

According to an unused capacity reservation process like this, the optimum reserved capacity, which is based on both the unused capacity of the pool LUs #0 through #4 and the performance values of the pool LUs #0 through #4, is reserved from each of the pool LUs #0 through #4 in the HDKCs #H0, #H5 and #H9. The number of actual pages allocated to each HDKC is limited to the range of the reserved capacity with respect to each of the pool LUs #0 through #4.

<Details of Initial Reservation Process>

Figure 18:
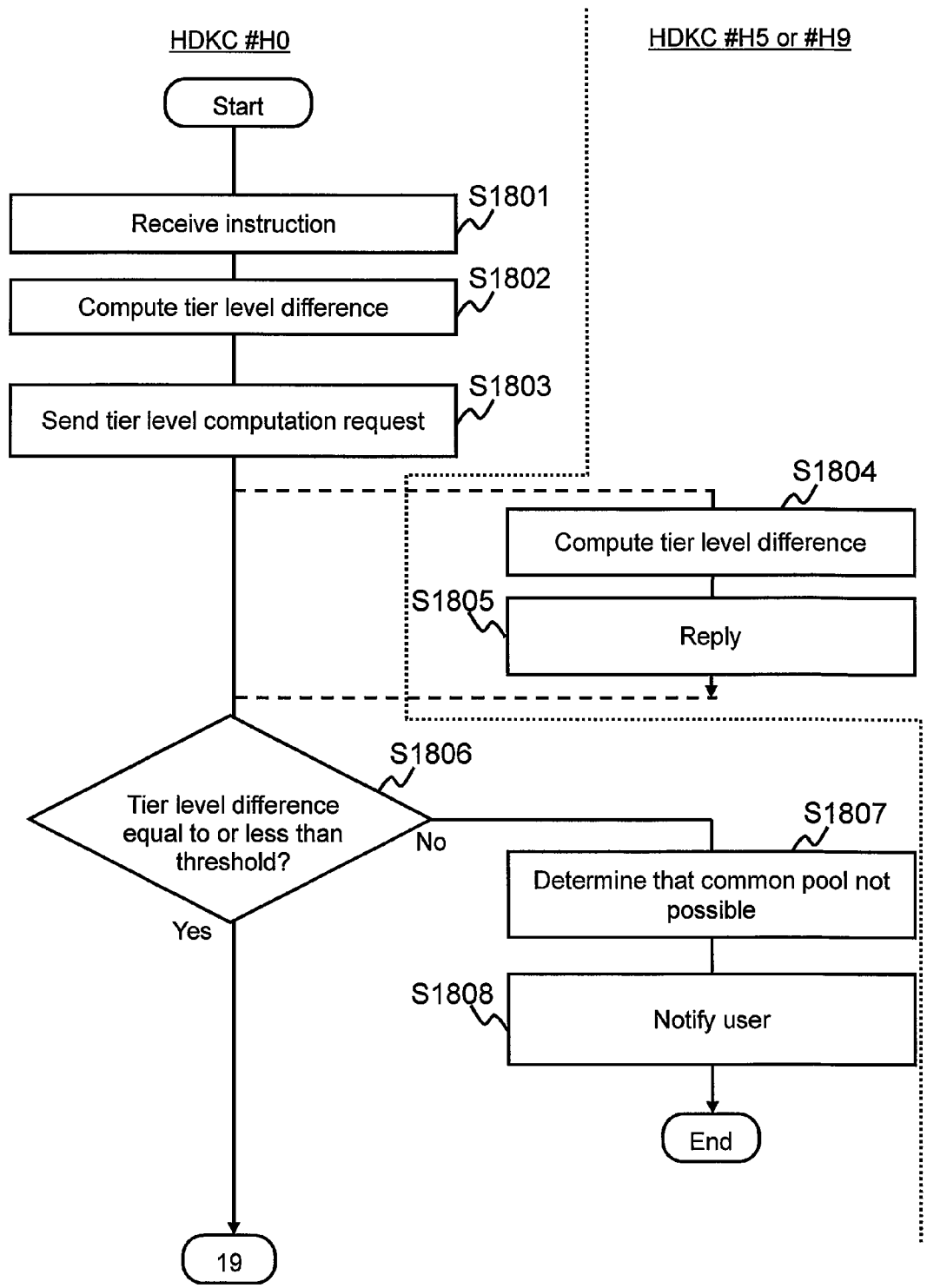
FIG. 18 shows a portion of an example of the flow of processing of an initial reservation process.
Figure 19:
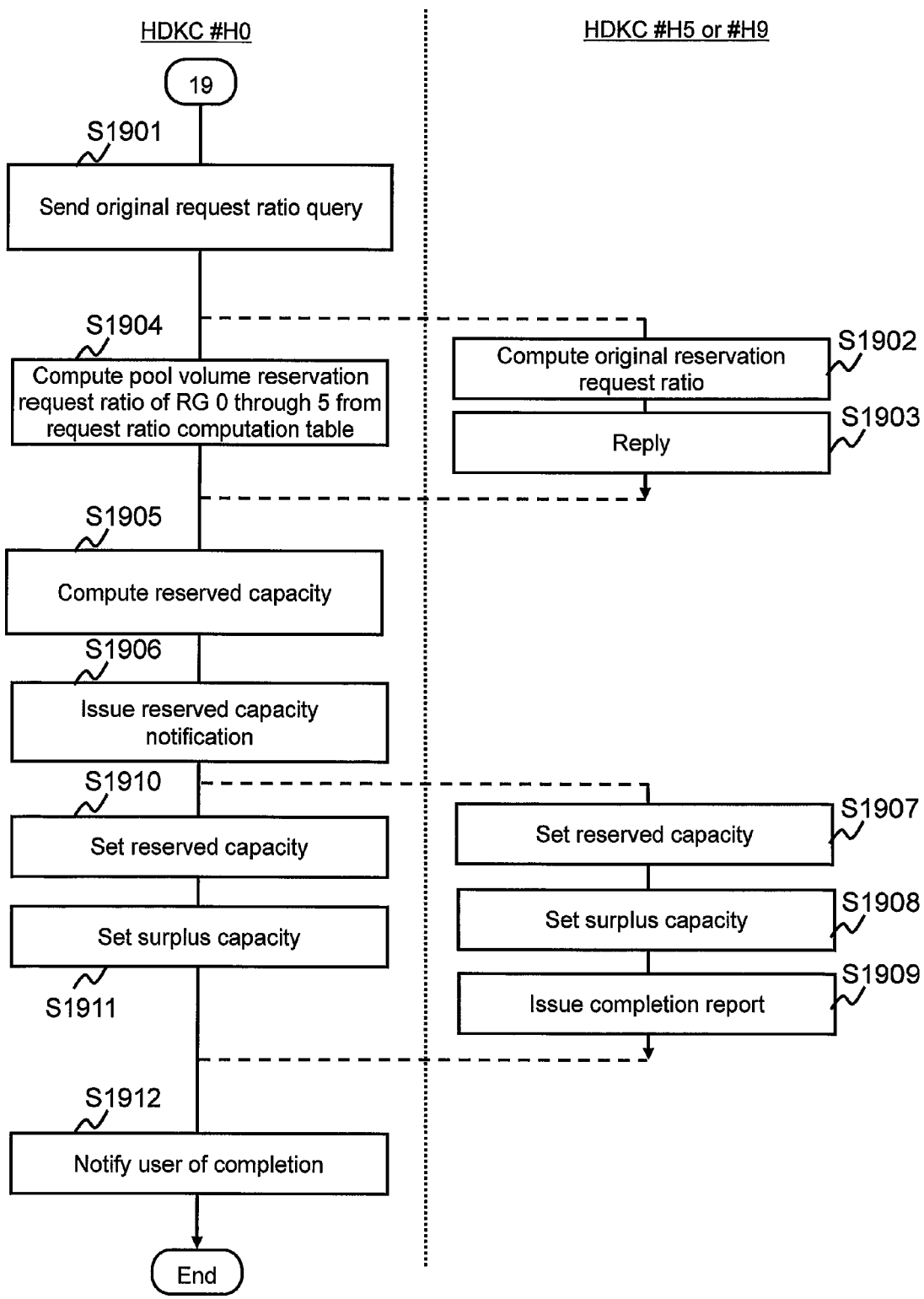
FIG. 19 shows the remaining portion of the example of the flow of processing of the initial reservation process.

FIGS. 18 and 19 show an example of the flow of processing of the initial reservation process.

In S1801, the internal controller of the master HDKC #H0 (hereinafter, the master internal controller) #H0 receives an instruction from an input device (for example, the management computer 201) to make a set of LUs #0 through #5 into a pool. In the following explanation, each LU specified in this instruction will be called a "pool LU candidate".

In S1802, the master internal controller #H0 checks the tier management table #H0. Specifically, the master internal controller #H0 identifies the tier level of the pool LU candidate with respect to each of the pool LU candidates #0 through #5 from the tier management table #H0, and computes the tier level difference (the difference between the highest tier level and the lowest tier level of the identified tier levels). In the above explanation, a performance difference is computed, but here a tier level difference is computed. Since the performance value is the inverse number of the tier level, the meanings of the performance difference and the tier level difference are substantially the same.

In S1803, the master internal controller #H0 sends a tier level difference computation request (a request to check the tier management table and compute the tier level difference with respect to the pool LU candidates #0 through #5) to the HDKCs #H5 and #H9.

In S1804, the internal controller #H5 (#H9) receives the tier level difference computation request, and checks the tier management table #H0 in response to this request. Specifically, the internal controller #H5 (#H9) identifies the tier level of a pool LU candidate with respect to each of the pool LU candidates #0 through #5 from the tier management table #H5 (#H9), and computes the tier level difference (the difference between the highest tier level and the lowest tier level of the identified tier levels).

In S1805, the internal controller #H5 (#H9) replies to the master HDKC #H0 with the tier level difference computed in S1804.

In S1806, the master internal controller #H0 receives a tier level performance difference reply from the HDKC #H5 (#H9), and determines whether or not the tier level difference is equal to or less than a threshold with respect to all of the HDKCs #H0, #H5, and #H9.

In a case where the result of the determination in S1806 is negative (S1806: NO), that is, in a case where the tier level difference exceeds the threshold with respect to at least one of the HDKCs #H0, #H5 and #H9, S1807 and S1808 are carried out. That is, in S1807, the master internal controller #H0 determines that it is not advisable to make the pool LU candidates #0 through #5 members of a shared pool because of the large tier level difference. In S1808, the master internal controller #H0 outputs to an output device (for example, either a display device or the management computer 201) information denoting that multiple pool LU candidates for which the tier level difference is equal to or less than the threshold will be selected. Thereafter, the user selects multiple LUs, and S1801 is carried out once again.

Furthermore, instead of S1807 and S1808, the master internal controller #H0 may decide on LUs #0 through #4, which have a tier level difference that is equal to or less than the threshold, as the pool LUs from among the pool LU candidates #0 through #5, and may carry out S1901 of FIG. 19 thereafter.

In a case where the result of the determination in S1806 is affirmative (S1806: YES), S1901 of FIG. 19 is carried out.

Furthermore, in the explanation of FIG. 19, it is supposed that the LUs #0 through #4 are specified as the pool LU in the instruction received in S1801.

In S1901, the master internal controller #H0 sends an original request ratio query with respect to the pool LUs #0 through #4 to the HDKCs #H5 and #H9.

In S1902, the internal controller #H5 (#H9) receives the original request ratio query with respect to the pool LUs #0 through #4, and computes the original request ratios $r_{05}$ through $r_{45}$ ($r_{09}$ through $r_{49}$) of the pool LUs #0 through #4 in response to this query.

In S1903, the internal controller #H5 (#H9) replies to the master HDKC #H0 with $r_{05}$ through $r_{45}$ ($r_{09}$ through $r_{49}$) computed in S1902.

After S1901, in S1904, the master internal controller #H0 computes the original request ratios $r_{01}$ through $r_{41}$ of the pool LUs #0 through #4.

In S1905, the master internal controller #H0 computes the reserved capacities $G_{00}$ through $G_{40}$, $G_{05}$ through $G_{45}$, and $G_{09}$ through $G_{49}$ on the basis of the original request ratios $r_{01}$ through $r_{41}$, $r_{05}$ through $r_{45}$, and $r_{09}$ through $r_{49}$ of the pool LUs #0 through #4. In the initial reservation process, since the ratio of the HDKC #H0 utilization ratio, the HDKC #H5 utilization ratio, and the HDKC #H9 utilization ratio is 1:1:1, the original request ratios $r_{01}$ through $r_{41}$, $r_{05}$ through $r_{45}$, and $r_{09}$ through $r_{49}$ and the processed request ratios $R_{01}$ through $R_{41}$, $R_{05}$ through $R_{45}$, and $R_{09}$ through $R_{49}$ are the same values.

In S1906, the master internal controller #H0 notifies the HDKC #H5 (#H9) of the reserved capacities $G_{00}$ through $G_{40}$, $G_{05}$ through $G_{45}$, and $G_{09}$ through $G_{49}$.

In S1907, the internal controller #H5 (#H9) sets the notified reserved capacities $G_{05}$ through $G_{45}$ ($G_{09}$ through $G_{49}$) in the detailed unused capacity management table #H5 (#H9) as the pool reserved capacity 1412 of the pool LUs #0 through #4.

In S1908, the internal controller #H5 includes the difference between the capacity of LU #2 (#3) and the total of the reserved capacities $G_{20}$, $G_{25}$ and $G_{29}$ (total of the reserved capacities $G_{30}$, $G_{35}$ and $G_{39}$) as the surplus capacity of the pool LU #2 (#3), for example, in management information. Similarly, the internal controller #H9 includes the difference between the capacity of LU #4 and the total of the reserved capacities $G_{40}$, $G_{45}$ and $G_{49}$ as the surplus capacity of the pool LU #4, for example, in the management information.

In S1909, the internal controller #H5 (#H9) notifies the master HDKC #H0 that pool reservation is complete.

After S1906, in S1910, the master internal controller #H0 sets the reserved capacities $G_{00}$ through $G_{40}$ in the detailed unused capacity management table #H0 as the pool reserved capacity 1412 of the pool LUs #0 through #4.

In S1911, the master internal controller #H0 includes the difference between the capacity of LU #0 (#1) and the total of the reserved capacities $G_{00}$, $G_{05}$ and $G_{09}$ (total of the reserved capacities $G_{10}$, $G_{15}$ and $G_{19}$) as the surplus capacity of the pool LU #0 (#H1), for example, in the management information.

The master internal controller #H0, upon completing S1911 and receiving pool-reservation-complete messages from the HDKCs #H5 and #H9, notifies the output device (for example, either the display device or the management computer 201) that the creation of the new pool is complete in S1912.

<Details of Additional Reservation Process>

Figure 20:
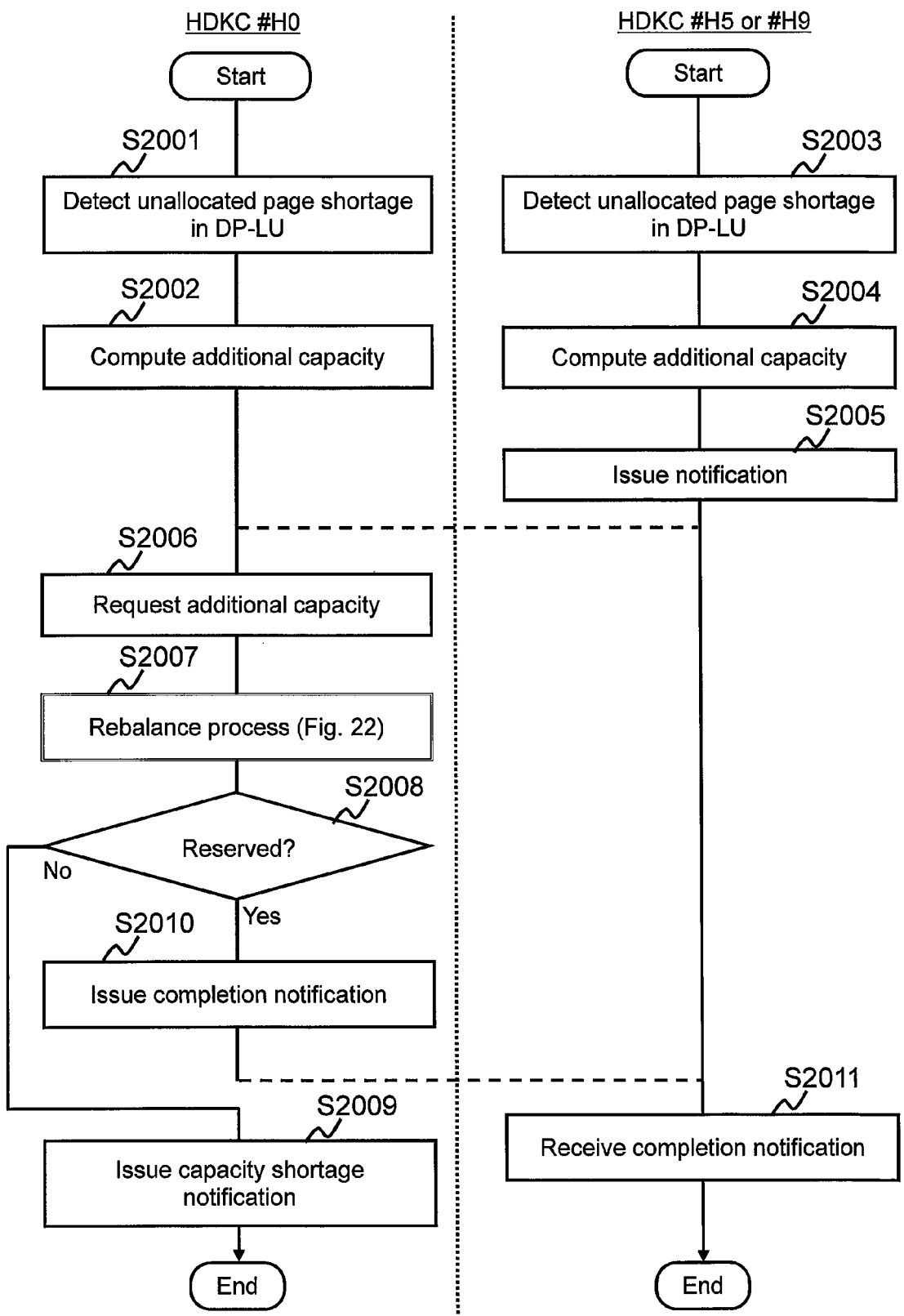
FIG. 20 shows an example of the flow of processing of an additional reservation process.

FIG. 20 shows an example of the flow of processing of the additional reservation process.

In a case where the unallocated page capacity (the number of virtual pages for which actual pages have not been allocated) of a certain DP-LU in the HDKC #H0 is equal to or less than a fixed percentage, the master internal controller #H0 detects this fact in S2001. Then the master internal controller #H0 determines additional capacity (absolute minimum capacity to be added) for the HDKC #H0 in S2002. This additional capacity, for example, may be computed in accordance with a prescribed rule that has been registered beforehand, or may be specified from the input device (for example, the management computer 201).

In a case where the unallocated page capacity (the number of virtual pages for which actual pages have not been allocated) of a certain DP-LU in either the HDKC #H5 or #H9 is equal to or less than a fixed percentage, in S2003, the internal controller #H5 (#H9) detects this fact. Then, in S2004, the internal controller #H5 (#H9) determines the additional capacity (absolute minimum capacity to be added) for the HDKC #H5 (#H9). This additional capacity, for example, may be computed in accordance with a pre-registered prescribed rule, or may be specified from the input device (for example, the management computer 201). In S2005, the internal controller #H5 (#H9) sends a capacity addition request specifying the additional capacity computed in S2004 to the master HDKC #H0.

In S2006, the master internal controller #H0 receives this capacity addition request.

That is, in a case where the fact that the unallocated page capacity of a certain DP-LU has become equal to or less than a fixed percentage in any of the HDKCs #H0, #H5 or #H9, S2007 and subsequent steps are carried out.

Figure 21:
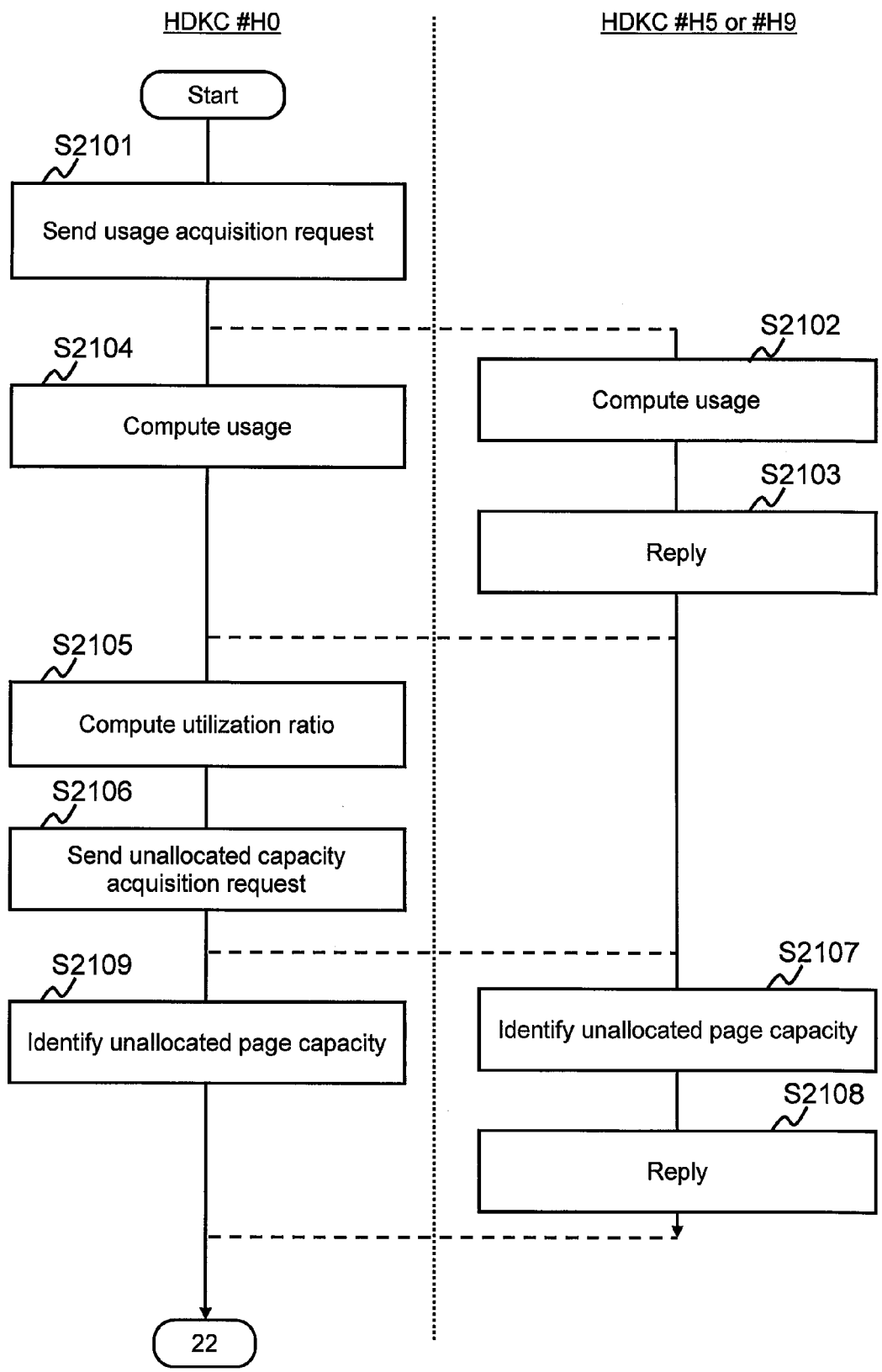
FIG. 21 shows a portion of an example of the flow of processing of a rebalance process.
Figure 22:
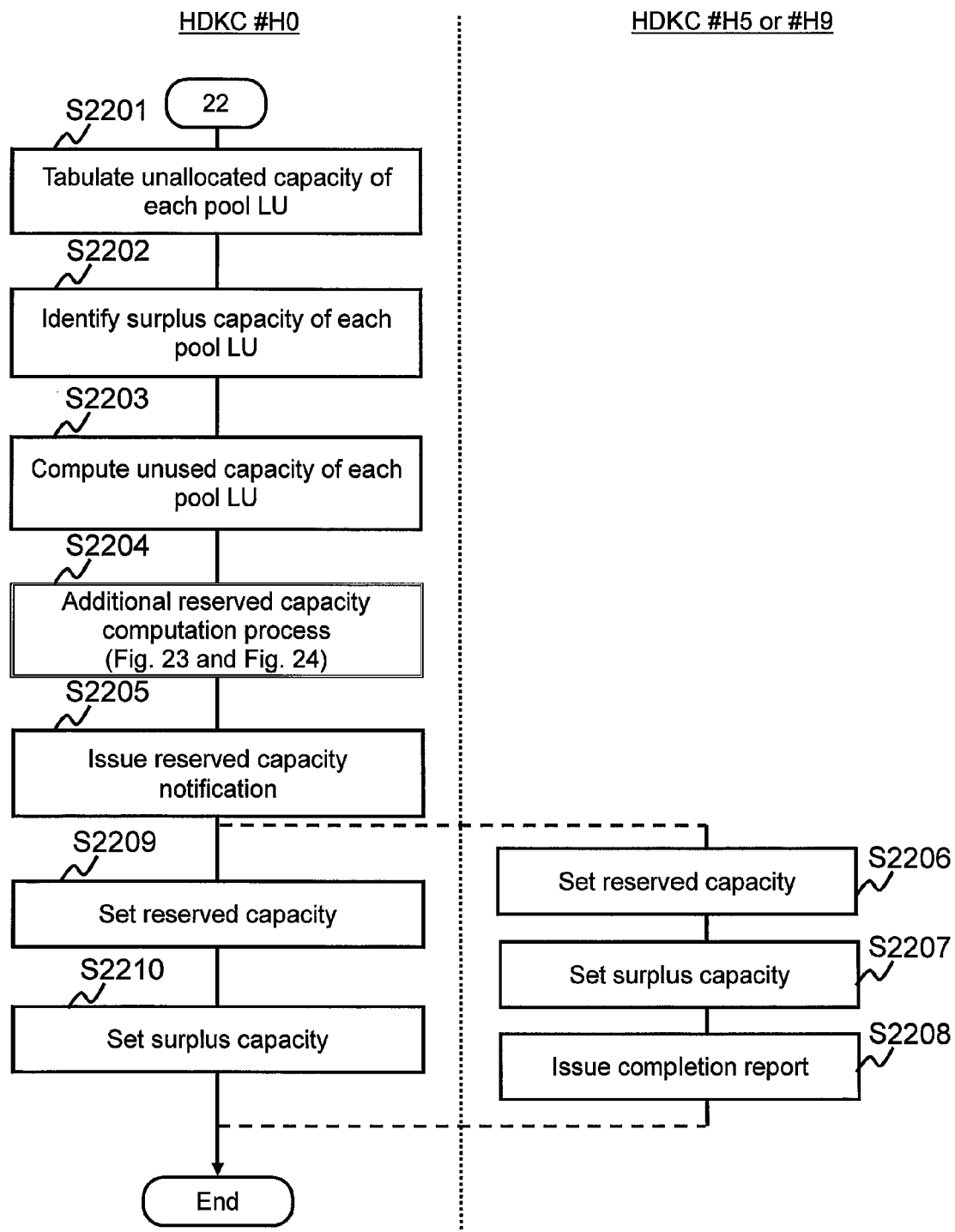
FIG. 22 shows the remaining portion of the example of the flow of processing of the rebalance process.

In S2007, the master internal controller #H0 executes the rebalance process (refer to FIGS. 21 and 22).

In S2008, the master internal controller #H0 determines whether or not the additional capacity specified in this request can be reserved in the HDKC that is the source of the request to add capacity.

In a case where the result of the determination in S2008 is negative (S2008: NO), in S2009, the master internal controller #H0 notifies the output device (for example, the display device or the management computer 201) of information denoting that there is a shortage of capacity in the pool 1500.

In a case where the result of the determination in S2008 is affirmative (S2008: YES), in S2010, the master internal controller #H0 notifies the HDKC, which is the source of the capacity addition request, that the addition of capacity is complete. In a case where the capacity-addition-complete notification-destination is HDKC #H5 (or #H9), in S2011, the internal controller #H5 (#H9) receives this completion notification.

FIGS. 21 and 22 show an example of the flow of processing of the rebalance process (S2007 of FIG. 20).

In S2101, the master internal controller #H0 sends a usage acquisition request (a request to acquire the usage (the number of allocated actual pages) from the immediately previous unused capacity reservation process (either the initial reservation process or the additional reservation process) to this additional reservation process) to the HDKCs #H5 and #H9.

In S2102, the internal controller #H5 (#H9) receives the usage acquisition request, and, in response to this request, computes the usage from the immediately previous unused capacity reservation process to this additional reservation process based on the unused capacity management table #H5 (#H9).

In S2103, the internal controller #H5 (#H9) notifies the master internal controller #H0 of the usage computed in S2102.

After S2101, in S2104, the master internal controller #H0 computes the usage from the immediately previous unused capacity reservation process to this additional reservation process based on the unused capacity management table #H5 (#H9).

In S2105, the master internal controller #H0 receives a usage notification from the HDKC #H5 (#H9), and computes the utilization ratios corresponding to the HDKCs #H0, #H5 and #H9 based on the usages corresponding to the HDKCs #H0, #H5 and #H9. The master internal controller #H0 stores the utilization ratios corresponding to the HDKCs #H0, #H5 and #H9, for example, in the memory.

In S2106, the master internal controller #H0 sends an unallocated capacity acquisition request with respect to pool LUs #0 through #4 (a request for the acquisition of values denoting the allocated page capacity 1413) to the HDKCs #H5 and #H9.

In S2107, the internal controller #H5 (#H9) identifies the values denoting the allocated page capacities 1413 of pool LUs #0 through #4 from the detailed unused capacity management table #H5 (#H9).

In S2108, the internal controller #H5 (#H9) notifies the master internal controller #H0 of the values denoting the allocated page capacities 1413 of pool LUs #0 through #4 identified in S2107.

After S2106, in S2109, the master internal controller #H0 identifies the values denoting the allocated page capacities 1413 of pool LUs #0 through #4 from the detailed unused capacity management table #H0.

In S2201, the master internal controller #H0 totals the unallocated page capacity 1413 in the HDKCs #H0, #H5 and #H9 with respect to each of the pool LUs #0 through #4.

In S2202, the master internal controller #H0 identifies the surplus capacity with respect to each of the pool LUs #0 through #4. The surplus capacity may be identified from the HDKCs #H5 and #H9, or the HDKC #H0 may store the surplus capacity of each of the pool LUs #0 through #4 and identify the surplus capacity from this stored information.

In S2203, the master internal controller #H0 computes, with respect to each of the pool LUs #0 through #4, the unused capacity, which is the total of the total value computed in S2201 and the surplus capacity identified in S2202, and stores information denoting the computed unused capacity, for example, in the memory (For example, refer to FIG. 15B).

Figure 23:
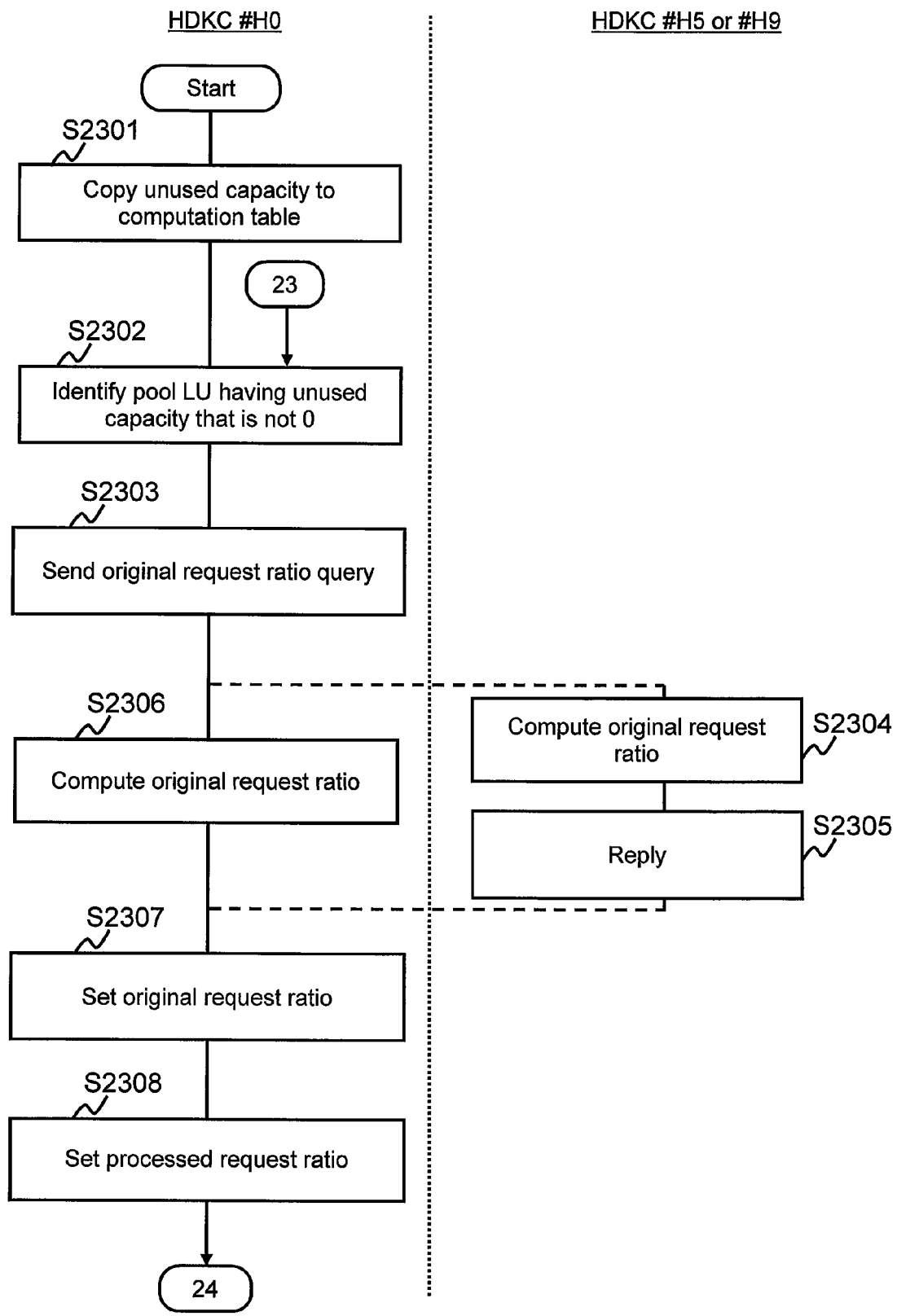
FIG. 23 shows a portion of an example of the flow of processing of an additional reserved capacity computation process.
Figure 24:
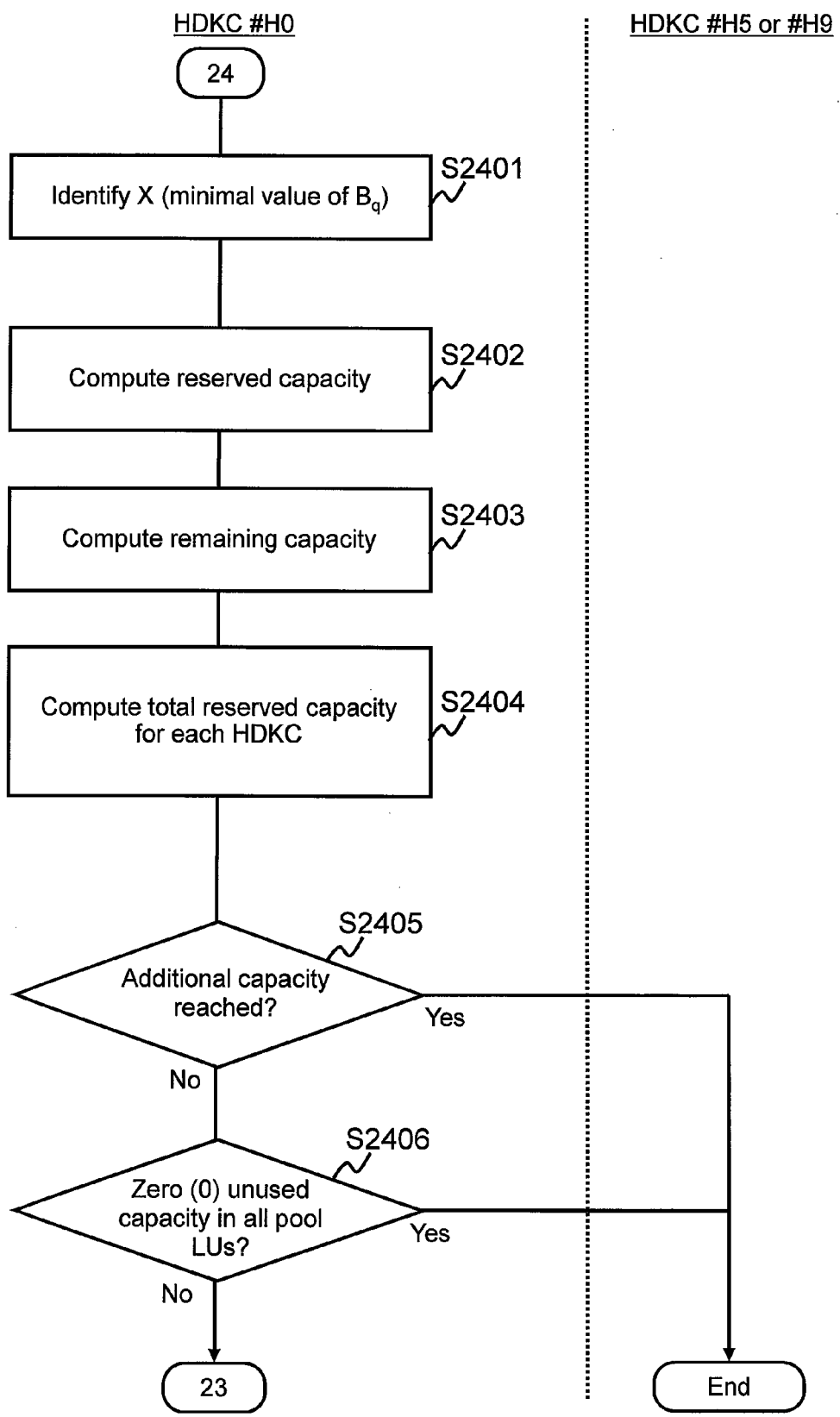
FIG. 24 shows the remaining portion of the example of the flow of processing of the additional reserved capacity computation process.

In S2204, the master internal controller #H0 executes an additional reserved capacity computation process (Refer to FIGS. 23 and 24).

In S2205, the master internal controller #H0 notifies the HDKC #H5 (#H9), which is the reservation destination of this reserved capacity, of the reserved capacity of each of the pool LUs #0 through #4 computed for each HDKC in S2204.

In S2206, the internal controller #H5 (#H9) sets the notified reserved capacity with respect to each of the pool LUs #0 through #4 in the detailed unused capacity management table #H5 (#H9) as the pool reserved capacity 1412.

In S2207, the internal controller #H5 (#H9) stores in memory, for example, the surplus capacity, which is the difference between the capacity of the pool LU and the pool reserved capacity 1412 of the pool LU, with respect to each of the pool LUs #0 through #4.

In S2208, the internal controller #H5 (#H9) notifies the master HDKC #H0 of the completion of pool reservation.

After S2205, in S2209, the master internal controller #H0 sets the reserved capacity computed in S2204 with respect to each of the pool LUs #0 through #4 in the detailed unused capacity management table #H0 as the pool reserved capacity 1412. Then, in S2210, the master internal controller #H0 stores in memory, for example, the surplus capacity, which is the difference between the capacity of the pool LU and the pool reserved capacity 1412 of the pool LU, with respect to each to the pool LUs #0 through #4.

FIGS. 23 and 24 show an example of the flow of processing of the additional reserved capacity computation process.

In S2301, the master internal controller #H0 copies the unused capacities $V_0$ through $V_4$ of the pool LUs #0 through #4 to a certain area of the memory (hereinafter called the computation table) (Refer to FIG. 16A).

In S2302, the master internal controller #H0 identifies the pool LU #q for which the unused capacity $V_g$ is not 0.

In S2303, the master internal controller #H0 sends to the HDKCs #H5 and #H9 queries concerning the original request ratios $r_{q5}$ and $r_{q9}$ with respect to each pool LU #q identified in the recent S2302.

In S2304, the internal controller #H5 (#H9) identifies the original request ratio $r_{q5}$ ($r_{q9}$) in response to this query with respect to each pool LU #q identified in the recent S2302.

In S2305, the internal controller #H5 (#H9) notifies the master HDKC #H0 of the original request ratio $r_{q5}$ ($r_{q9}$) identified in the S2304.

After S2303, in S2306, the master internal controller #H0 identifies the original request ratio $r_{q0}$ with respect to each pool LU #q identified in the recent S2302.

In S2307, the master internal controller #H0 sets the original request ratios $r_{q0}$, $r_{q5}$ and $r_{q9}$ in the computation table.

In S2308, the master internal controller #H0 updates the request ratios set in the computation table to the processed request ratios $R_{q0}$, $R_{q5}$ and $R_{q9}$. As described hereinabove, the processed request ratios $R_{q0}$, $R_{q5}$ and $R_{q9}$ are values computed based on the utilization ratios of the HDKCs #H0, #H5 and #H9 and the original request ratios $r_{q0}$, $r_{q5}$ and $r_{q9}$. The master internal controller #H0 computes $K_q$, which is the total of the processed request ratios $R_{q0}$, $R_{q5}$ and $R_{q9}$, with respect to each of the pool LUs #q identified in the recent S2302.

In S2401, the master internal controller #H0 computes (refer to FIG. 17A) $B_q$, which is obtained by dividing the unused capacity $V_q$ by the $K_g$, with respect to each of the pool LUs #q identified in the recent S2302. The master internal controller #H0 identifies X, which is equivalent to the smallest $B_q$ of the computed $B_q$s.

In S2402, the master internal controller #H0 computes (Refer to FIG. 17B) the sum of the X (the smallest $B_q$) identified in S2401 and the processed request ratio $R_{qp}$ for each HDKC #Hp with respect to each of the pool LUs #q identified in the recent S2302.

In S2403, the master internal controller #H0 computes the remaining capacity $U_g$ by subtracting $Z_q$ (the total of $G_{q0}$, $G_{q5}$ and $G_{q9}$) from the unused capacity $V_q$ with respect to each of the pool LUs #q identified in the recent S2302.

In S2404, the master internal controller #H0 computes $Y_p$, which is the total of the reserved capacities $G_{qp}$, for each HDKC #Hp.

In S2405, the master internal controller #H0 determines whether or not the total reserved capacity $Y_p$ corresponding to the HDKC #Hp, which is the source of the request for additional capacity, is equal to or larger than the additional capacity that was requested. In a case where the result of the determination in S2405 is affirmative (S2405: YES), the additional reserved capacity computation process ends.

In a case where the result of the determination in S2405 is negative (S2405: NO), in S2406, the master internal controller #H0 determines whether or not the unused capacity $V_q$ of each of the pool LUs #q identified in the recent S2302 has reached 0. In a case where the result of the determination in S2406 is affirmative (S2406: YES), the additional reserved capacity computation process ends.

In a case where the result of the determination in S2406 is negative (S2406: NO), S2302 is carried out with respect to the pool LU(s) for which the unused capacity $V_q$ is not 0.

An embodiment of the present invention has been explained hereinabove, but the present invention is not limited to this embodiment, and it goes without saying that various changes are possible without departing from the gist thereof.

[Reference Signs List]

110 Storage system

The invention claimed is:

1. A storage system, which comprises multiple storage control apparatuses,
wherein the multiple storage control apparatuses comprise two or more first storage control apparatuses and a second storage control apparatus,
the two or more first storage control apparatuses comprise two or more virtual volumes and two or more storage devices,
each virtual volume is partitioned into two or more virtual areas,
a pool, which is a storage area configured by the two or more storage devices, is formed, and each storage device is partitioned into two or more actual areas,
the first storage control apparatus is configured so as to carry out processing of (A) through (C) below:
(A) receiving a write command, which specifies a virtual volume of the first storage control apparatus;
(B) allocating an actual area from the pool to a write-destination virtual area identified on the basis of the write command received in the (A) in a case where an actual area has not been allocated to the write-destination virtual area; and
(C) writing write-targeted data in accordance with the write command to the actual area allocated to the write-destination virtual area,
the second storage control apparatus carries out (a) and (b) below either once or multiple times:
(a) determining, for each storage device, an unused capacity to be given to the first storage control apparatus with respect to each first storage control apparatus based on the unused capacity of each storage device and a request value of each storage device for each first storage control apparatus; and
(b) giving, for each first storage control apparatus, the unused capacity of each storage device determined with respect to the first storage control apparatus, to the first storage control apparatus,
the request value of the storage device is based on a performance value, which is a value related to a performance of the storage device, and
a total capacity of the multiple actual areas allocated to one or more virtual volumes of the first storage control apparatus by the first storage control apparatus subsequent to the recent time at which the (a) and (b) are carried out, is equal to or less than the unused capacity given with respect to each storage device in the (b) at the recent time.

2. A storage system according to claim 1, wherein, in the (a), the second storage control apparatus:
(a1) identifies, from among the two or more storage devices, a storage device which is used the most by the two or more first storage control apparatuses; and
(a2) computes, for each storage device, the unused capacity to be given with respect to each first storage control apparatus based on a request value of the storage device for the two or more first storage control apparatuses, using as a criteria the giving of all of the unused capacity of the storage device identified in the (a1) to the two or more first storage control apparatuses based on the request value of the storage device for the two or more first storage control apparatuses.

3. A storage system according to claim 2, wherein, in the (a1), the second storage control apparatus:
(a11) computes, for each storage device, a first type value, which is a value based on two or more request values corresponding to the two or more first storage control apparatuses; and
(a12) computes, for each storage device, a second type value, which is a value based the unused capacity of the storage device and the first type value of the storage device,
wherein a storage device, which corresponds to a second type value that satisfies a prescribed condition, is a storage device in which the unused capacity is exhausted first in a case where the unused capacity of the two or more storage devices has been used in accordance with two or more request values corresponding to the two or more first storage control apparatuses with respect to each storage device, and
the unused capacity, which is computed in the (a2) with respect to each storage device and given to each first storage control apparatus, is a value computed on the basis of the second type value that satisfies the prescribed condition and the two or more request values corresponding to the two or more first storage control apparatuses.

4. A storage system according to claim 3, wherein the performance value of the storage device with respect to each first storage control apparatus is a value determined based on a value of a tier to which the storage device belongs from among multiple tiers for the first storage control apparatus,
the first type value of the storage device is a total of the two or more request values corresponding to the two or more storage control apparatuses with respect to the storage device,
the second type value of the storage device is computed by dividing the unused capacity of the storage device by the first type value of the storage device,
the prescribed condition indicates the smallest value of the two or more second type values,
the unused capacity, which is computed in the (a2) with respect to each storage device and given to each first storage control apparatus, is computed by multiplying the second type value, which satisfies the prescribed condition, by the two or more request values corresponding to the two or more first storage control apparatuses with respect to each storage device,
the request value of each storage device is a value such that a total of the request values of the two or more storage devices becomes a prescribed value with respect to each first storage control apparatus,
the request value of each storage device for each first storage control apparatus is based on the ratio of the unused capacities used after the (a) and (b) of the previous time are carried out until the (a) and (b) of the time are carried out,
the tier to which the storage device belongs is determined based on aspects of (F) through (H) below:
(F) whether or not the first storage control apparatus, which has the storage device, comprises a device constituting the basis of the storage device;

(G) the type of a coupling mode which, in a case where an apparatus other than the first storage control apparatus, which has the storage device, comprises the device constituting the basis of the storage device, couples the first storage control apparatus and the other apparatus; and (H) the type of the storage device.

5. A storage system according to claim 4, wherein, in the (a2), in a case where an unused capacity exceeding the unused capacity of the storage device is computed with respect to the storage device, or the unused capacity computed with respect to the first storage control apparatus is less than the unused capacity required for the first storage control apparatus, (f) and (g) below are carried out:

(f) a request value for each first storage control apparatus is updated with respect to the remaining storage devices except for the storage device identified in the (a1); and (g) the (a1) and (a2) are carried out based on the updated request value with respect to the remaining storage devices except for the storage device identified in the (a1), and in the (a1) and (a2), a value obtained by subtracting the unused capacity computed in the (a2) of the immediately previous time from the unused capacity of the storage device is used as the unused capacity of the storage device.

6. A storage system according to claim 2, wherein, in a case where a result of the (a) is equivalent to a prescribed condition, (f) and (g) below are carried out:

(f) a request value for each first storage control apparatus is updated with respect to the remaining storage devices except for the storage device identified in the (a1); and (g) the (a1) and (a2) are carried out based on the updated request value with respect to the remaining storage devices except for the storage device identified in the (a1), and in the (a1) and (a2), a value obtained by subtracting the unused capacity computed in the (a2) of the immediately previous time from the unused capacity of the storage device is used as the unused capacity of the storage device.

7. A storage system according to claim 1, wherein the request value of each storage device is a value such that a total of the request values of the two or more storage devices becomes a prescribed value with respect to each first storage control apparatus.

8. A storage system according to claim 1, wherein the performance value of the storage device with respect to each first storage control apparatus is a value determined based on a value of a tier to which the storage device belongs from among multiple tiers for the first storage control apparatus, and the tier to which the storage device belongs is determined based on aspects of (F) through (H) below:

(F) whether or not the first storage control apparatus, which has the storage device, comprises a device constituting the basis of the storage device;

(G) the type of a coupling mode which, in a case where an apparatus other than the first storage control apparatus, which has the storage device, comprises the device constituting the basis of the storage device, couples the first storage control apparatus and the other apparatus; and (H) the type of the storage device.

9. A storage system according to claim 1, wherein the request value of each storage device for each first storage control apparatus is based on the ratio of the unused capacities used after the (a) and (b) of the previous time are carried out until the (a) and (b) of the time are carried out.

10. A storage system according to claim 1, wherein the request value of each storage device for each first storage control apparatus is based on an importance of the first storage control apparatus and/or an importance of the storage device for the first storage control apparatus.

11. A storage system according to claim 10, wherein the case where the result of the (a) is equivalent to a prescribed condition is a case where an unused capacity exceeding the unused capacity of the storage device is computed with respect to the storage device, or the unused capacity computed with respect to the first storage control apparatus is less than the unused capacity required for the first storage control apparatus.

12. A storage system according to claim 1, wherein the pool is configured by multiple storage devices, and the two or more storage devices from among the multiple storage devices are storage devices obtained by excluding, from the multiple storage devices, a storage device having a performance value of less than a prescribed performance value for at least one of the first storage control apparatuses.

13. A storage system according to claim 1, wherein any one of the two or more first storage control apparatuses is the second storage control apparatus.

14. A method which is carried out by a second storage control apparatus in a storage system comprising two or more first storage control apparatuses, the method comprising carrying out (a) and (b) below either once or multiple times:

(a) determining, for each storage device, an unused capacity to be given to the first storage control apparatus with respect to each first storage control apparatus based on an unused capacity of each storage device and a request value of each storage device for each first storage control apparatus; and (b) giving, for each first storage control apparatus, the unused capacity of each storage device determined with respect to the first storage control apparatus, to the first storage control apparatus, wherein the two or more first storage control apparatuses comprise two or more virtual volumes and two or more storage devices, each virtual volume is partitioned into two or more virtual areas, a pool, which is a storage area configured by the two or more storage devices, is formed, and each storage device is partitioned into two or more actual areas, the first storage control apparatus is configured so as to carry out processing of (A) through (C) below:

(A) receiving a write command, which specifies a virtual volume of the first storage control apparatus;

(B) allocating an actual area from the pool to a write-destination virtual area identified on the basis of the write command received in the (A) in a case where an actual area has not been allocated to the write-destination virtual area; and (C) writing write-targeted data in accordance with the write command to the actual area allocated to the write-destination virtual area, the request value of the storage device is based on a performance value, which is a value related to a performance of the storage device, and a total capacity of the multiple actual areas allocated to one or more virtual volumes of the first storage control apparatus by the first storage control apparatus subsequent to the recent time at which the (a) and (b) are carried out, is equal to or less than the unused capacity given with respect to each storage device in the (b) at the recent time.

15. A second storage control apparatus in a storage system comprising two or more first storage control apparatuses, comprising:
- an interface device, which is coupled to at least one of the two or more first storage control apparatuses; and
- a controller, which is coupled to the interface device,
- wherein the controller carries out (a) and (b) below either once or multiple times:
- (a) determining, for each storage device, an unused capacity to be given to the first storage control apparatus with respect to each first storage control apparatus based on an unused capacity of each storage device, and a request value of each storage device for each first storage control apparatus; and
- (b) giving, for each first storage control apparatus, the unused capacity of each storage device determined with respect to the first storage control apparatus, to the first storage control apparatus,
- the two or more first storage control apparatuses comprise two or more virtual volumes and two or more storage devices,
- each virtual volume is partitioned into two or more virtual areas,
- a pool, which is a storage area configured by the two or more storage devices, is formed, and each storage device is partitioned into two or more actual areas,
- the first storage control apparatus is configured so as to carry out processing of (A) through (C) below:
- (A) receiving a write command, which specifies a virtual volume of the first storage control apparatus;
- (B) allocating an actual area from the pool to a write-destination virtual area identified on the basis of the write command received in the (A) in a case where an actual area has not been allocated to this to the write-destination virtual area; and
- (C) writing write-targeted data in accordance with the write command to the actual area allocated to the write-destination virtual area,
- the request value of the storage device is based on a performance value, which is a value related to a performance of the storage device, and
- a total capacity of the multiple actual areas allocated to one or more virtual volumes of the first storage control apparatus by the first storage control apparatus subsequent to the recent time at which the (a) and (b) are carried out, is equal to or less than the unused capacity given with respect to each storage device in the (b) at the recent time.

* * * * *